US007916657B2

(12) United States Patent
Doverspike et al.

(10) Patent No.: US 7,916,657 B2
(45) Date of Patent: Mar. 29, 2011

(54) NETWORK PERFORMANCE AND RELIABILITY EVALUATION TAKING INTO ACCOUNT ABSTRACT COMPONENTS

(75) Inventors: Robert Duncan Doverspike, Tinton Falls, NJ (US); Kostas Oikonomou, Colts Neck, NJ (US); Rakesh K. Sinha, Edison, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 255 days.

(21) Appl. No.: 12/075,735

(22) Filed: Mar. 13, 2008

(65) Prior Publication Data
US 2009/0185499 A1   Jul. 23, 2009

Related U.S. Application Data

(60) Provisional application No. 61/011,814, filed on Jan. 22, 2008.

(51) Int. Cl.
*H04L 1/00* (2006.01)
(52) U.S. Cl. ...................................................... 370/252
(58) Field of Classification Search .................. 370/237, 370/238, 250, 251, 252
See application file for complete search history.

(56) References Cited

OTHER PUBLICATIONS

Chiu et al, Performability Analysis of Multi-layer Restoration in a Satellite Network, Springer-Verlag, 15 pages, 2007.*
Sinha et al, Improved Bounds for Network Performability Evaluation Algorithms, AT&T Labs Research, 3 pages, Mar. 2006.*
Miremadi et al, Performability Estimation of Networks Services in the Presence of Component Failures, Sharif University of Technology, 6 pages, 2007.*
T. Gomes, et al. "A Case Study of Reliability Analysis of a Multi-exchange Telecommunication Network." *Advances in Safety and Reliability*, C. G. Soares, ed. Elsevier Science, 1997, vol. 3, p. 2377 et seq.
C.L. Yang et a;. "Efficient computation of most probable states for communication networks with multimode components." *IEEE Transactions on Communications*, vol. 37, No. 5, May, 1989, pp. 535-537.
S. Chiou et al, "Reliability Analysis of a Communication Network with Multimode Components," *IEEE Journal on Selected Areas in Communications*, vol. 4, Issue 7, Oct. 1986, pp. 1156-1161.
G. Alvarez, M. Uysal, A. Merchant, "Efficient verification of performability guarantees", PMCCS-5: The Fifth International Workshop on Performability Modelling of Computer and Communication Systems, 2001.

* cited by examiner

Primary Examiner — Frank Duong
(74) Attorney, Agent, or Firm — Ronald D. Slusky

(57) ABSTRACT

Network performability characteristics with improved accuracy are derived by taking into account, in the various analyzed network failure states, attributes of elements at the logical level other than just the capacities of edges, as well as by taking into account one or more "abstract components," such as scheduled maintenance, and by using multiple traffic matrices.

6 Claims, 22 Drawing Sheets

FIG. 4a

| COMPONENT | PROBABILITY OF FAILURE |
|---|---|
| C1 | P1 |
| C2 | P2 |
| C3 | P3 |

FIG. 4b

| STATES | | | | STATE PROBABILITY | PERFORMANCE MEASURE VALUES |
|---|---|---|---|---|---|
| | C3 | C2 | C1 | | |
| 0 | 0 | 0 | 0 | SP0=(1−P3)x(1−P2)x(1−P1) | F0 |
| 1 | 0 | 0 | 1 | SP1=(1−P3)x(1−P2)xP1 | F1 |
| 2 | 0 | 1 | 0 | SP2=(1−P3)xP2x(1−P1) | F2 |
| 3 | 0 | 1 | 1 | SP3=(1−P3)xP2x'P1 | F3 |
| 4 | 1 | 0 | 0 | SP4=P3x(1−P2)x(1−P1) | F4 |
| 5 | 1 | 0 | 1 | SP5=P3x(1−P2)xP1 | F5 |
| 6 | 1 | 1 | 0 | SP6=P3xP2x(1−P1) | F6 |
| 7 | 1 | 1 | 1 | SP7=P3xP2xP1 | F7 |

| COMPONENT | FAILURE MODE | PROBABILITY OF FAILURE |
|---|---|---|
| C1 | $C1_1$ | P1 |
| C2 | $C2_1$ | P2 |
| C3 | $C3_1$ $C3_2$ $C3_3$ | $P3_1$ $P3_2$ $P3_3$ |

FIG. 5b

| | STATES | | | | | STATE PROBABILITY | PERFORMANCE MEASURE |
|---|---|---|---|---|---|---|---|
| | $C3_3$ | $C3_2$ | $C3_1$ | $C2_1$ | $C1_1$ | | |
| 0 | 0 | 0 | 0 | 0 | 0 | SP0=$(1-P3_3)$x$(1-P3_2)$x$(1-P3_1)$x$(1-P2)$x$(1-P1)$ | F0 |
| 1 | 0 | 0 | 0 | 0 | 1 | SP1=$(1-P3_3)$x$(1-P3_2)$x$(1-P3_1)$x$(1-P2)$x$1-P1$ | F1 |
| 2 | 0 | 0 | 0 | 1 | 0 | SP2=$(1-P$ | F2 |
| 3 | 0 | 0 | 0 | 1 | 1 | | F3 |
| 4 | 0 | 0 | 1 | 0 | 0 | | F4 |
| 5 | 0 | 0 | 1 | 0 | 1 | $)$x$P3_1$x$(1-P2)$x$P1$ | F5 |
| 6 | 0 | 0 | 1 | 1 | 0 | SP6=$(1-P3_3)$x$(1-P3_2)$x$P3_1$x$P2$x$(1-P1)$ | F6 |
| 7 | 0 | 0 | 1 | 1 | 1 | SP7=$(1-P3_3)$x$(1-P3_2)$x$P3_1$x$P2$x$P1$ | F7 |
| 8 | 0 | 1 | 0 | 0 | 0 | SP8=$(1-P3_3)$x$P3_2$x$(1-P3_1)$x$(1-P2)$x$(1-P1)$ | F8 |
| 9 | 0 | 1 | 0 | 0 | 1 | SP9=$(1-P3_3)$x$P3_2$x$(1-P3_1)$x$(1-P2)$x$P1$ | F9 |
| 10 | 0 | 1 | 0 | 1 | 0 | SP10=$(1-P3_3)$x$P3_2$x$(1-P3_1)$x$P2$x$(1-P1)$ | F10 |
| 11 | 0 | 1 | 0 | 1 | 1 | SP11=$(1-P3_3)$x$P3_2$x$(1-P3_1)$x$P2$x$P1$ | F11 |
| 12 | 1 | 0 | 0 | 0 | 0 | SP12=$P3_3$x$(1-P3_2)$x$(1-P3_1)$x$(1-P2)$x$(1-P1)$ | F12 |
| 13 | 1 | 0 | 0 | 0 | 1 | SP13=$P3_3$x$(1-P3_2)$x$(1-P3_1)$x$(1-P2)$x$P1$ | F13 |
| 14 | 1 | 0 | 0 | 1 | 0 | SP14=$P3_3$x$(1-P3_2)$x$(1-P3_1)$x$P2$x$(1-P1)$ | F14 |
| 15 | 1 | 0 | 0 | 1 | 1 | SP15=$P3_3$x$(1-P3_2)$x$(1-P3_1)$x$P2$x$P1$ | F15 |

TRAFFIC MATRIX I
WEEKDAYS 7 AM TO 6 PM
32% OF YEARLY HOURS

| NODES → ↓ | 1 | 2 | 3 | 4 | 5 |
|---|---|---|---|---|---|
| 1 |  | b1 | c1 | d1 | e1 |
| 2 | f1 |  | h1 | i1 | j1 |
| 3 | k1 | l1 |  | n1 | o1 |
| 4 | p1 | q1 | r1 |  | t1 |
| 5 | u1 | v1 | w1 | x1 |  |

TRAFFIC MATRIX II
WEEKDAYS 6 PM TO 7 AM
38% OF YEARLY HOURS

| NODES → ↓ | 1 | 2 | 3 | 4 | 5 |
|---|---|---|---|---|---|
| 1 |  | b2 | c2 | d2 | e2 |
| 2 | f2 |  | h2 | i2 | j2 |
| 3 | k2 | l2 |  | n2 | o2 |
| 4 | p2 | q2 | r2 |  | t2 |
| 5 | u2 | v2 | w2 | x2 |  |

TRAFFIC MATRIX III
WEEKENDS/HOLIDAYS
30% OF YEARLY HOURS

| NODES → ↓ | 1 | 2 | 3 | 4 | 5 |
|---|---|---|---|---|---|
| 1 |  | b3 | c3 | d3 | e3 |
| 2 | f3 |  | h3 | i3 | j3 |
| 3 | k3 | l3 |  | n3 | o3 |
| 4 | p3 | q3 | r3 |  | t3 |
| 5 | u3 | v3 | w3 | x3 |  |

FIG. 13

```
┌── Hybrid most probable states algorithm ──────────────┐
1  │ Set up data structures needed by algorithms B and M'.
2  │ Put the most probable state in the priority queue Q
3  │ repeat {
4  │   remove the most probable state s from Q
5  │   exit if the accumulated probability is ≥ 1 - ε
6  │   if s is a 1-state then
7  │     apply the rules of B to generate its next 1-states and add them to Q
8  │   if s contains non-binary components then
9  │     apply the rules of M' to generate its next non 1-states and add
10 │     them to Q
11 │ }
```

FIG. 14

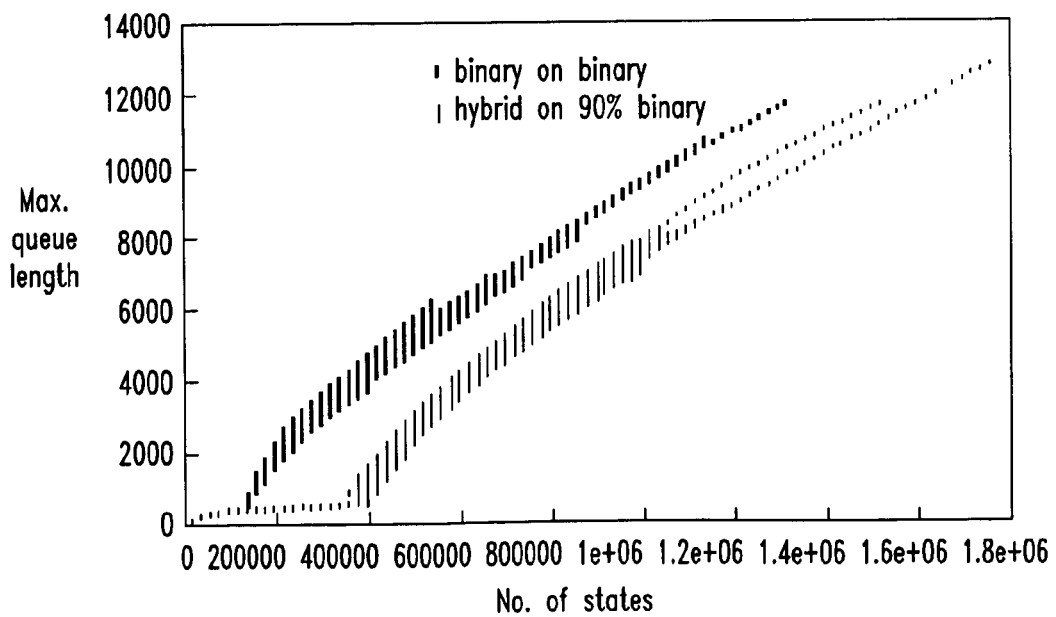

FIG. 15a

"Real" network view

| TRAFFIC LEVEL |

E.g. 156 Mb/s from A to B, 2 Gb/s from B to A, 45 Mb/s from C to D, etc.

| TRANSPORT LEVEL |

(1) Nodes (e.g. router type A, router type B, . . .) and links (e.g. OC-192, OC-48, . .)
(2 Routing/restoration scheme.

| PHYSICAL LEVEL |

E.g. DWDM (dense wavelength division multiplexer), OA (optical amplifier), fiber length, OT (optical transponder), router control module, router port, etc.

FIG. 15b

Model view

| DEMAND LEVEL |

Demands exist between pairs of graph nodes, flow over graph edges.

| GRAPH LEVEL |

(1) Nodes, and directed multi-edges with lengths, capacities, etc.
(2) Routing and restoration algorithms for demands.

| COMPONENT LEVEL |

Network equipment or failure modes of a certain type are represented by components of the same class.

| RELIABILITY LEVEL |

Reliability of each class of component (MTBF and MTTR).

FIG. 16a
COMPOSITE LINK
WITH CONSTITMENTS
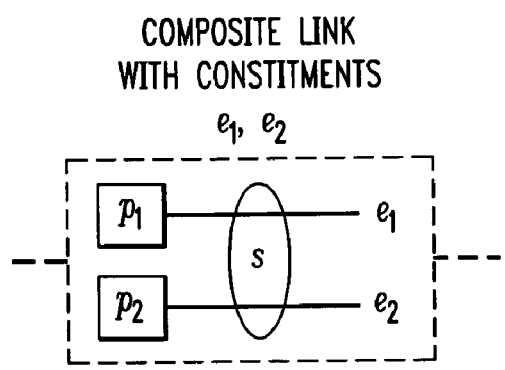
FIG. 16b
| s | $p_1$ | $p_2$ | LINK CAPACITY |
|---|---|---|---|
| 0 | – | – | 0 |
| 1 | 0 | 0 | 0 |
| 1 | 0 | 1 | c |
| 1 | 1 | 0 | c |
| 1 | 1 | 1 | 2c |
FIG. 17a
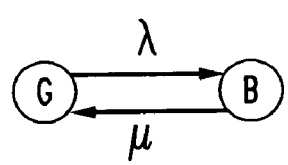
BINARY COMPONENT
(ONE FAILURE MODE)
FIG. 17b
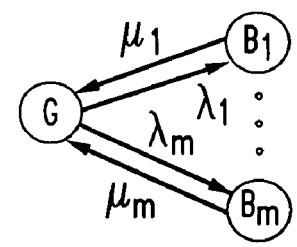
MULTI-MODE
COMPONENT WITH m
FAILURE MODES

FIG. 19

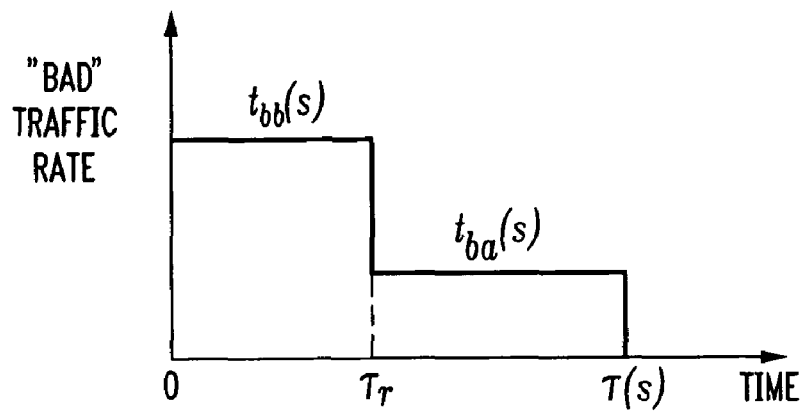

FIG. 20

```
                    ─── Near-optimal routing ───
1
2   for k := 1 to R do   # try R random orderings
3      construct a random ordering of N demands
4      for i := 1 to N do
5         route demand i: solve 1-commodity min-cost flow problem
6         adjust the spare edge capacities
7         update the total demand satisfied and the total cost incurred
8         if the min-cost problem is infeasible then
9            route as many units of demand i as possible by max-flow
10     end
11     update the best solution found so far
12  end
13  report the solution with maximal total flow of least cost
```

```
─────── Dynamic all-pairs minimum-cost path ───────
1   Initialize D to D_0, the all-pairs min-cost path matrix for the graph with
2       no failed edges
3   for every (s, d) ∈ AffectedNodePairs do
4       # EdgeCost[s, d] is x if (s, d) is undefined or failed
5       D[s, d] := EdgeCost[s, d]
6   for k := 1 to n do
7       for every (s, d) ∈ AffectedNodePairs do
8           D[s, d] := min(D[s, d], D[s, k] + D[k, d])
9   end
10  return D
```

UPPER AND LOWER BOUNDS FOR THE "fat" NETWORK

LOWER BOUNDS FOR ALL THREE DESIGNS

NETWORK PERFORMANCE AND RELIABILITY EVALUATION TAKING INTO ACCOUNT ABSTRACT COMPONENTS

CROSS-REFERENCE TO RELATED APPLICATION

This application claims the benefit of U.S. Provisional application 61/011,814 filed Jan. 22, 2008.

BACKGROUND

The present disclosed method relates to techniques for evaluating the performance and/or reliability of communications networks, or of any system that can be modeled as a communications network.

As communications networks have grown in size and complexity, the evaluation of their performance and reliability has become more critical. Network service providers usually guarantee a certain level of service, in terms of down time, restoration delay, packet delay, etc., to their enterprise customers. Violating these agreements results in a penalty to the service providers. In turn, the enterprise customers incur business losses if their networks do not perform as expected. There are even some legal requirements on U.S. businesses to be aware of their network's "risk profile" (e.g., the US Sarbanes-Oxley act of 2002).

Some aspects of the service level have to do purely with reliability, such as downtime, while others are pure performance measures, such as packet delay. Each can be evaluated or predicted in isolation by an appropriate model and technique, but as networks are becoming larger and more complex, it is becoming less realistic to consider only pure reliability measures or to evaluate performance measures as if the network were always in its perfect (no failure) state. Even though the complexity of real networks often requires that performance and reliability evaluations be treated separately from each other, a combined, simultaneous evaluation, known as performability analysis, is very informative.

Performability analysis consists in characterizing failures probabilistically and evaluating a performance measure (or measures) over a large set of network states. There is one "perfect" network state in which all of the network components are assumed to be operating properly. Every other network state is characterized by the failure of one or more of the network components. Among the various network states that would be evaluated are a) states in which a particular component is assumed to have failed (in combination with the failure of zero or more other components) and b) other states in which that particular component is assumed to have not failed. The probability of various kinds of components failing is known, based on experience, information from manufacturers, and statistical sampling techniques, and that probability is a factor in the probability of the occurrence of those states in which the component in question is assumed to have failed and ultimately, then, in computing the overall performability characteristic in question.

An individual network component may actually have more than one failure mode. For example, a link that normally has bandwidth X may fail in such a way that the available bandwidth is X/2, X/3, etc. Another failure mode is one in which the link has failed completely and thus no bandwidth is available. Any one or these possibilities can occur in some network states. A typical performance measure is packet delay, as mentioned above. Another is the percentage of offered traffic that cannot be delivered due to the particular failures represented by the network state, referred to herein as "percent traffic lost." Such performance measures are computed based on an assumed traffic matrix, i.e., an assumed amount of traffic demand between each origin/destination node pair in the network and, in a typical application, are computed after a network restoration algorithm has been applied to the network in the assumed state in order to reroute as much of the traffic as possible.

The performance measure value computed for each network state is then multiplied by the probability of occurrence of that state (which is, in turn, a function of the probability of failure of the components assumed to have failed for that state) and the resultant products are used to derive a performability characteristic. A simple performability characteristic is what is called the "expectation" of a particular performance measure, given by the sum of the products just described. A more sophisticated performability characteristic that can be derived from this analysis is a performability guarantee of the form: "with X % probability, at most Y % of the network traffic will have no path."

A whole set of performability characteristics can be developed in this way by considering multiple performance measures for each network state.

For each network state, there is a characterization of the network at the component level. In order to carry out the analysis just described, a logical level characterization is generated for each network state. The logical level characterization characterizes the network in terms of nodes and edges that interconnect them. The nodes at the logical level correspond to packet routers or other similar components, whereas the edges represent routes for traffic through the network which may traverse one or more physical links. A failure of one or more components at the component level—including optical fiber spans, routers, repeaters or other physical components—may affect the capacity of one or more edges at the logical level, capacity being a measure of the amount of traffic that can traverse an edge as reflected by, for example, the bandwidth of the edge or the bit rate or packet rate that it can support. Given an assumed traffic matrix as mentioned above, one can then use known network analysis techniques to compute the desired performance measure—such as, again, packet delay or percent traffic lost—after any restoration algorithm used in the network has been run on to the network state under investigation.

One can then compute desired performability characteristic(s) such as those mentioned above, i.e., the performance measure's expectation or some performance guarantee.

SUMMARY

In determining the effects on traffic, at the logical level, of the failures that characterize a particular network state, prior art approaches focus on the capacities of edges, as described above.

In accordance with one aspect of our method, we have recognized that more accurate performability characteristics can be derived by including in the component-level characterization of the network one or more of what we refer to as "abstract components." These are aspects of the network and/ or its operation that can have the same kind of effect at the logical level—and thus on traffic and the performance measure—as an actual physical component failure. An example is a "scheduled maintenance" component. This relates to routine scheduled maintenance of, say, the network's routers, during which a router either has certain of its traffic-handling capabilities reduced or is taken out of service altogether. This has the same effect at the logical level as a total or partial failure of the router. By knowing the frequency and duration of scheduled maintenance being performed on routers in the network, it is possible to assign a probability of the occurrence of such an abstract "failure" of the routers and to include, among the network states, states in which any given router is out-of-service ("failed") as a result of its scheduled maintenance.

BRIEF DESCRIPTION OF THE DRAWING

In the drawing,

FIG. 1b is a logical level view of the network of FIG. 1a;

FIGS. 4a, 4b, 5a and 5b are tables helpful in explaining the computation of a performability characteristic;

FIGS. 6a, 7a, 8a and 9a show the network of FIG. 1a in particular respective failure states and illustrate the computation of performability characteristics for the network of FIG. 1a;

FIG. 10 shows three traffic matrices that can be used in computing a performability characteristic;

FIGS. 13-26 are figures that help to explain the theoretical underpinnings of the invention as presented at the end of the Detailed Description.

DETAILED DESCRIPTION OF THE ILLUSTRATIVE EMBODIMENT

Basic Performability Characteristic Computation

Figure 1A:
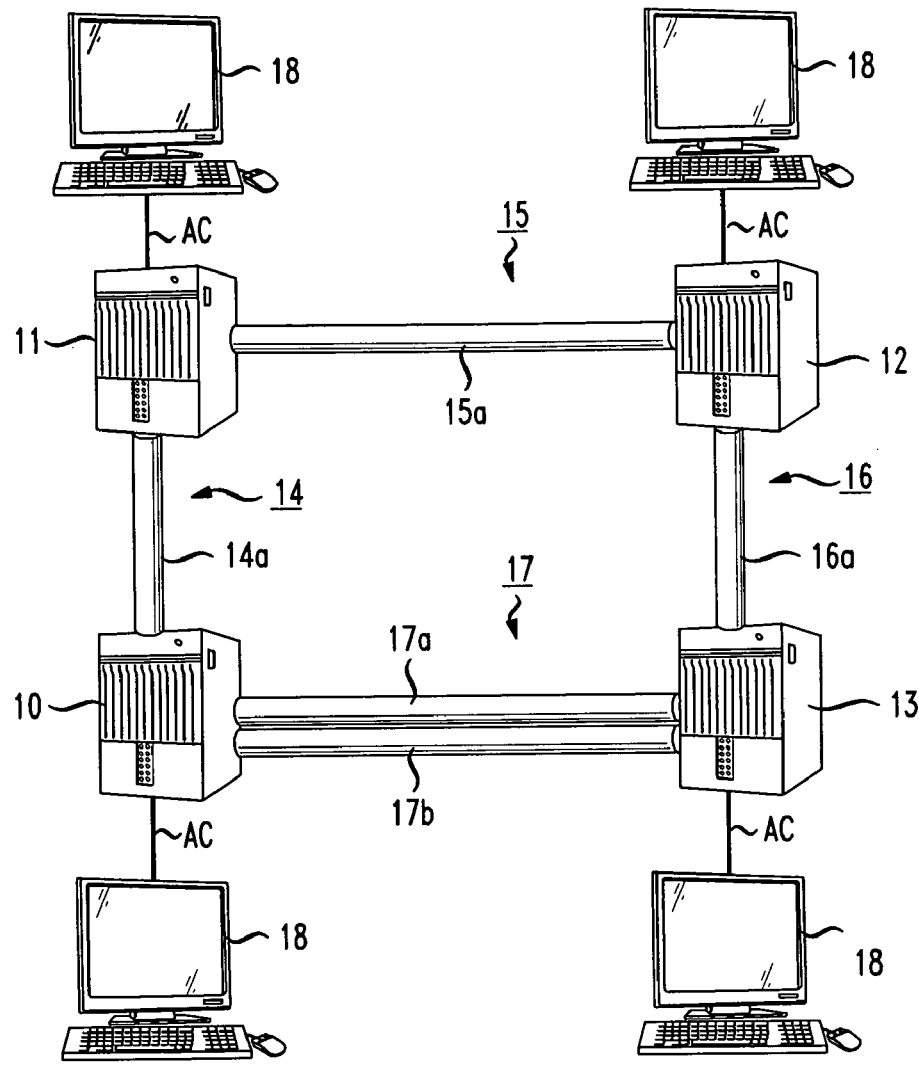
FIG. 1a is a view of the component level of a network for which a performability characteristic can be derived.

FIG. 1a presents a so-called "component view" of a simple packet communications network for which a performability characteristic can be derived pursuant to the principles of our method. It will be appreciated that a real-life network would typically be much more expansive, and thus comprising many more components, than shown in this simple example. This component view is also referred to herein as the "physical network."

The physical network comprises four packet routers 10 through 13 which are interconnected by links 14 through 17 as shown. Each of the links illustratively comprises one or more optical fiber cables. Illustratively, links 14 through 16 each include one optical fiber cable 14a through 16a, respectively, while link 17 includes two optical fiber cables 17a and 17b. A link may include various other components (not shown) such as one or more repeaters, amplifiers, etc.

Each of the depicted endpoints 18 is representative of a number of origin and destination endpoints for packet traffic, which are connected to the routers via respective access networks denoted AC.

Each of the various network components shown in FIG. 1a and/or their sub-components is subject to failure with some probability which, as is well known, can be derived from statistical studies of mean time between failures (MTBF) and mean time to repair (MTTR) of the components. A real-world network would not only have more components than are shown in the simple example of FIG. 1A, but also a wider variety of components, each possibly subject to failure with some probability. In addition, it is possible to assess the failure modes of the network more finely by considering the failure rates of sub-components, such the line cards and switching fabrics of the routers 10 through 14.

Figure 1B:
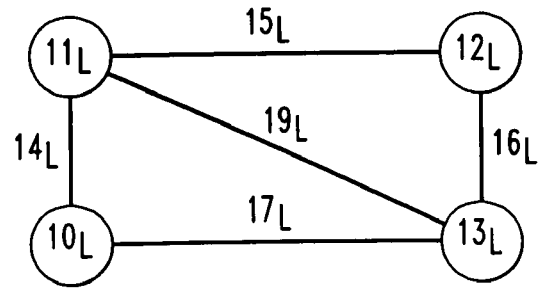

FIG. 1b is a logical level characterization of the same network, also referred to herein as the "logical network". The logical level characterization describes the network in terms of nodes and edges that interconnect them. Each edge represents a particular route, or path, that has been established for traffic through the network and may correspond to multiple links of the physical network. The logical network of FIG. 1b comprises nodes $10_L$ through $13_L$ corresponding to routers 10 through 13 of the physical network. The logical network also includes particular routes for traffic through the network. It may be seen, in particular, that the logical network includes edge $14_L$ between nodes $10_L$ and $11_L$; edge $15_L$ between nodes $11_L$ and $12_L$; edge $16_L$ between nodes $12_L$ and $13_L$; and edge $17_L$ between nodes $13_L$ and $10_L$. The four edges $14_L$ through $17_L$ illustratively correspond to physical links 14 through 17, respectively. The logical network also includes edge $19_L$ for traffic between nodes $11_L$ and $13_L$. As seen from FIG. 1a, there is no physical link directly connecting routers 11 and 13. Rather the traffic associated with edge $19_L$ actually traverses links 15 and 16 of the physical network. FIGS. 1a and 1b represent a first state of the network—the so-called "perfect" network state in which there are no failures.

Figure 2A:
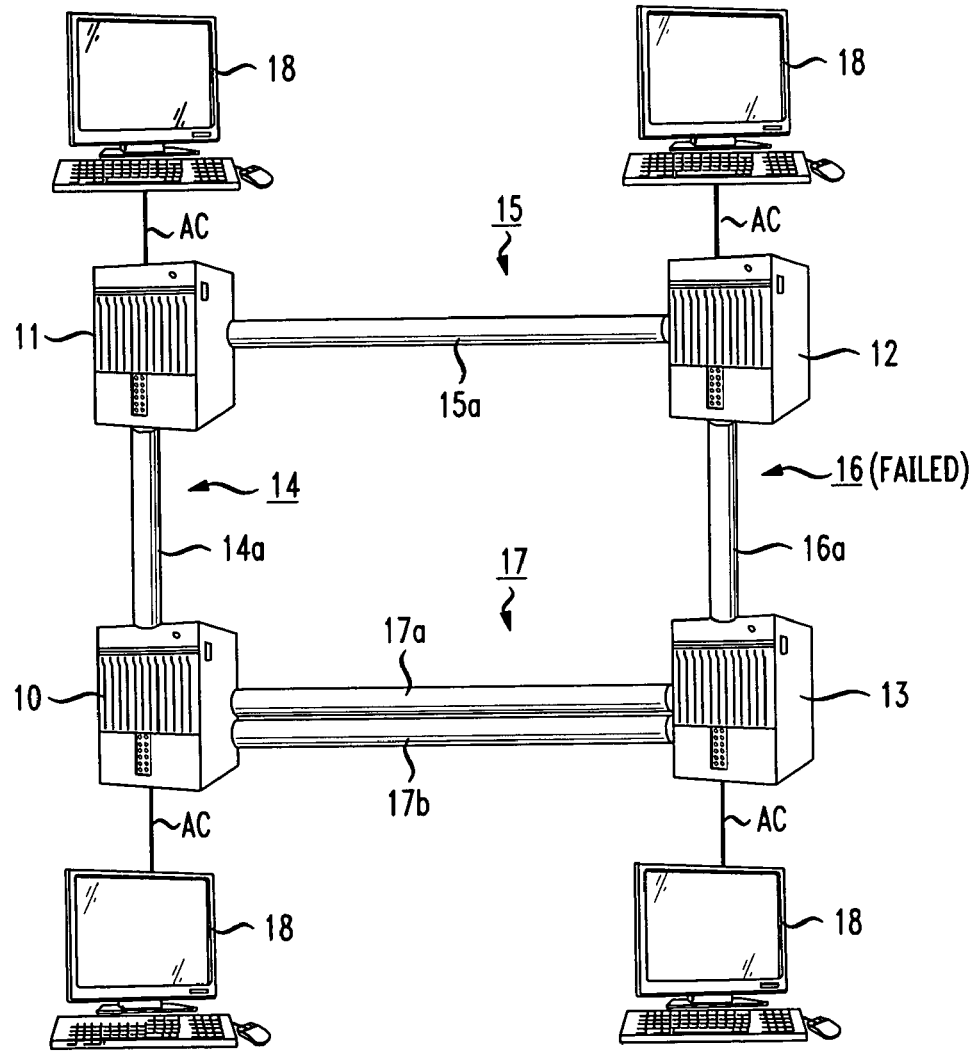
FIGS. 2a and 3a show the network of FIG. 1 in particular respective failure states.
Figure 2B:
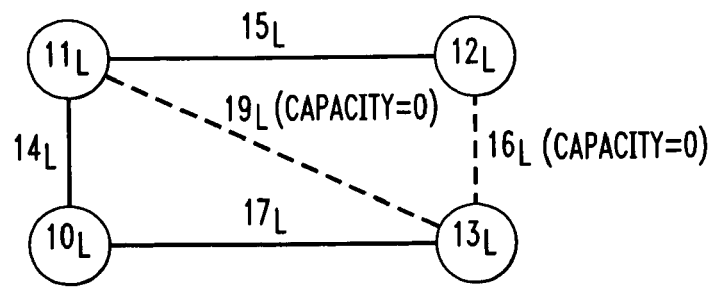
FIGS. 2b and 3b are logical level views of the network in the failure states depicted in FIGS. 2a and 3a, respectively.

A failure in a physical component of the network at the component level has implications for the routing of traffic over the edges of the logical network. For example, FIG. 2a shows a network state in which link 16 has totally failed, thereby reducing the bandwidth capacity of both edges $16_L$ and $19_L$ to zero, as shown in FIG. 2b. A restoration algorithm may reroute some or all of the traffic between nodes 11L and 13L on links 14 and 17. Thus, after restoration, edge 19L may be regarded as restored, possibly to its full capacity. Similarly, some or all the traffic between nodes 12L and 13L that went over link 16 may be rerouted over links 15, 14, 17, and thus edge 16L may be considered restored, possibly to its full capacity.

Figure 3A:
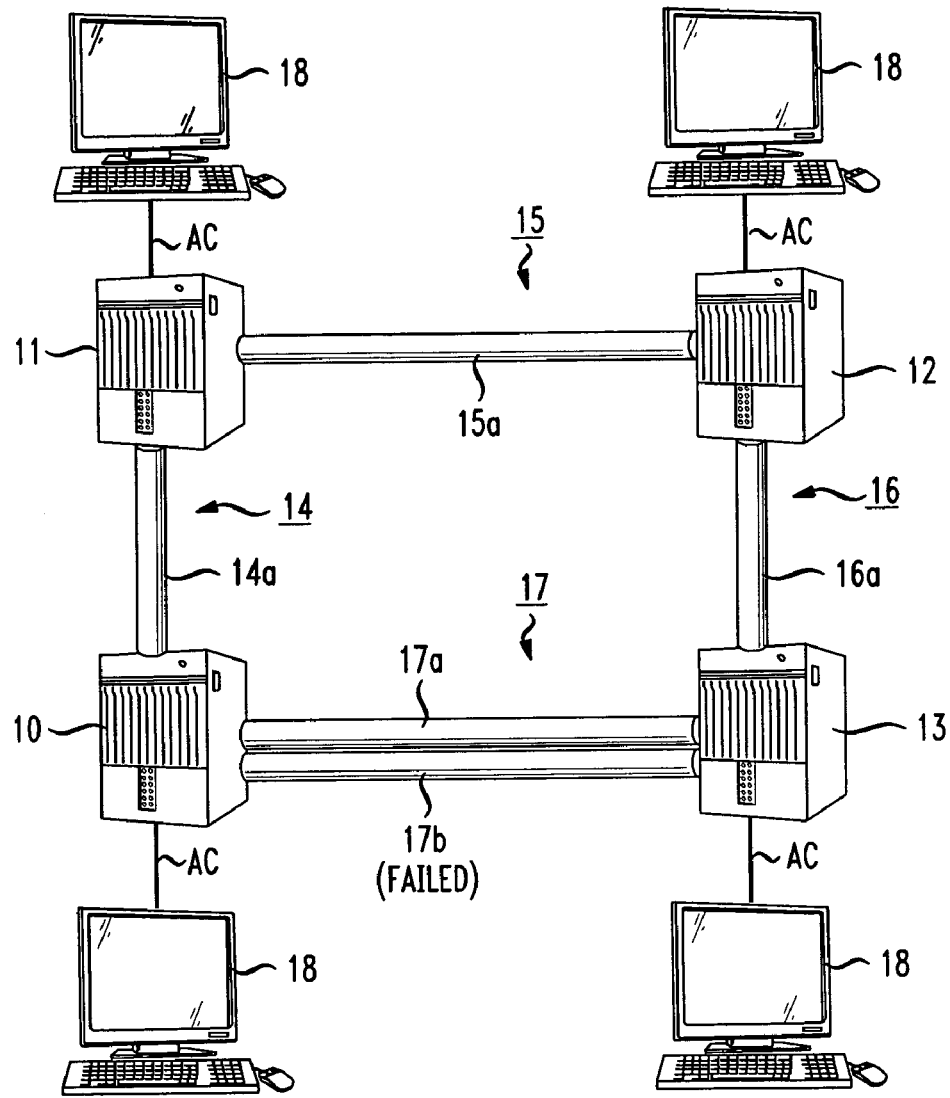
Figure 3B:
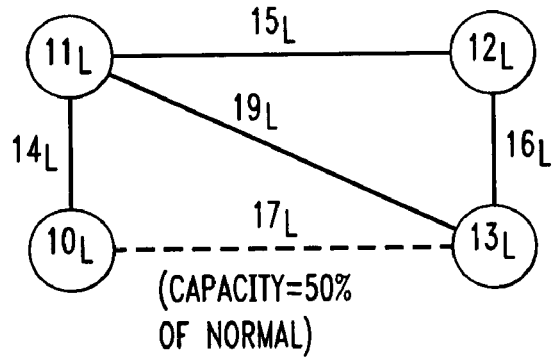

The physical network of FIG. 1a has many more possible network states—each corresponding to a respective logical network—depending on which components and/or combinations of components might fail at any given time. For example, FIG. 3a shows another network state, in which cable 17b—one of the two cables of link 17—has failed, resulting in edge $17_L$ having only 50% of its normal capacity. Unlike the case of FIGS. 2a/2b, edge $19_L$ is unaffected by this particular failure since it does not traverse the physical link 17.

Multiple concurrent failures of components of the network are also possible, and the resulting logical networks would represent network states in which the paths take all such failures into account. Examples of that are given below.

Figure 11:
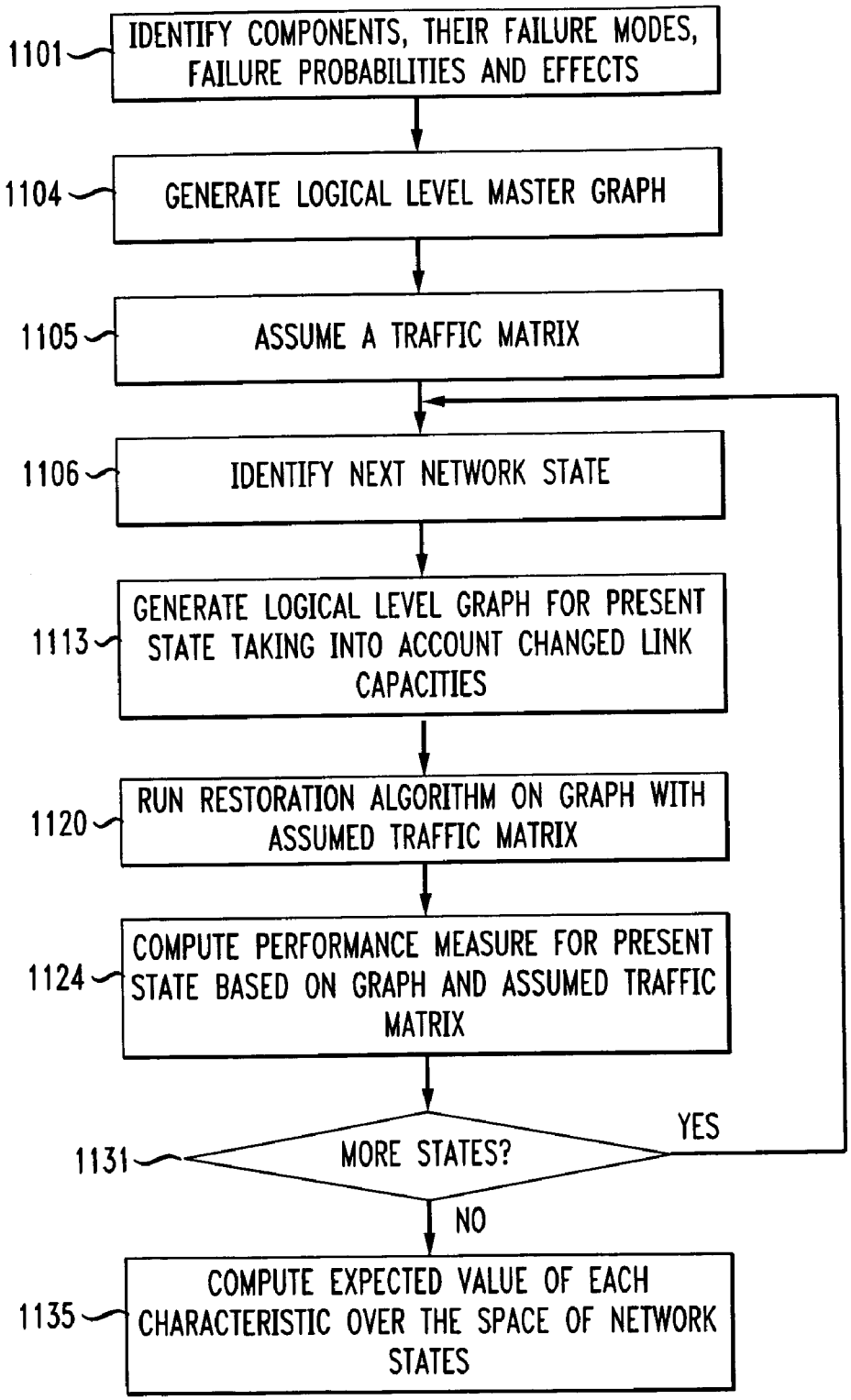
FIG. 11 is a flowchart of a typical prior art process for computing a performability measure.

FIG. 11 is a flowchart of a prior art process for computing performability characteristic(s) of a network such as the network of FIG. 1a.

The process begins (as indicated at 1101) by identifying all the components of the physical network that are subject to failure. Also identified are their respective failure modes and the effects that each possible failure mode will have at the logical level. For example, we saw above that among the effects of the failure of link 16 is that the bandwidth capacities of both edges $16_L$ and $19_L$ are reduced to zero.)

A logical level "master" graph is then generated (1104), showing all the nodes and edges of the network at the logical level. The graph of FIG. 1b is such a master graph.

A traffic matrix must also be assumed (1105). That is, we must assume some level of traffic between the various origin-destination node pairs. This statistical model of the offered traffic is typically derived from actual network measurements. One could also use a hypothetical traffic matrix in order to compute desired network performability characteristic(s) under an assumed traffic demand.

The process of identifying the network states then begins (1106). As already indicated, each network state is characterized by a set of one or more failures of one or more physical components. The process will typically not actually consider all of the network states in carrying out the performability characteristic computation, because there are typically too many states to consider in order for the computation to be carried out in a reasonably short time. This is discussed further below.

The identified state is now considered (1109). We first generate a logical level graph for that state (1113) by applying to the master graph the effects at the logical level of the failures assumed for this state. The graph of FIG. 2*b* is an example of a logical level graph for the network state that assumes the failure of link 16.

The real-life network being modeled may employ a restoration algorithm that attempts to reroute traffic after network failures. In that case, the particular restoration algorithm that is used in that network is applied (1120) to the logical level graph of the network for the assumed network state before computing the desired performance measure(s), such as packet delay or percent traffic lost. The reason is that the performability characteristic computed for the network should reflect the extent to which the network is able to recover from failures and to therefore ameliorate the effects of those failures.

We can now compute the performance measure(s) of interest, e.g., packet delay or percent traffic lost using known network analysis techniques (1124).

The performance measure thus computed is only for a particular network state. What we care about is an overall performability characteristic of the network, taking into account a) the various ways in which components can fail, both singly and in various combinations, and b) the failure probabilities. Accordingly, if there are more states to be considered (1131), we consider the next state (1106) and carry out the performance measure computation for that state, and so on, after which the desired performability characteristic(s), such as the expectation of a given performance measure, can be computed (1135).

It is possible to compute the desired performance measure, and thus the overall performability characteristic, over the entire set of possible network states. However, as noted above, there are typically too many states to consider in order for the computation to be carried out in a reasonably short time. What one can do is to consider the network states at 1109 and 1132 in order of decreasing probability and update the performability characteristic(s) of interest after the performance measure has been calculated after every N states, where N is any convenient integer. The successive values of each performability characteristic will begin to converge after some number of network states has been considered and one can use, for example, the rate of convergence to determine when the last-computed performability characteristic value is "close enough" for the purposes at hand so that one need not take further states into account.

FIGS. 4*a* and 4*b* illustrate the computation of a performability characteristic F for a simple network assumed to have only three components that may fail, denoted C1, C2 and C3. As shown in FIG. 4*a*, components C1, C2 and C3 have probabilities of failing P1, P2 and P3, respectively. Assuming that each of the components C1, C2 and C3 can fail independently, the overall network has seven failure states—denoted 1 through 7 in FIG. 4*b*—in which any one, any two, or all three of the components C1, C2 and C3 have failed, the bit value "1" or "0" in a particular column respectively indicating that the associated component either has or has not failed. There is also the perfect state, numbered 0. The probability of the network being in any state is found in the form of a product of probabilities determined by the bit vector corresponding to the state: in forming the product, if a bit is 1 we take the failure probability of that component, and if it is 0 we take 1 minus the failure probability. For example, state 5 in which components C1 and C3 have failed, is defined by the bit vector 101, so its probability is $SP5 = P1 \times (1-P2) \times P3$.

Associated with network states 0 through 7 are respective performance measure values F0 through F7 of a performance measure F, F being, for example, "percent lost traffic." The values of F0 through F7 are computed in a manner well known to those in the art, based on a) the logical network associated with any given failure or combination thereof and b) an assumed traffic matrix. As already noted, the restoration algorithm used by typical real-world networks to re-route traffic in response to traffic-disruptive component failures would typically be applied to the logical network associated with each network state before computing the performance measure values F1 through F7.

The assumed performability characteristic of interest is the expectation $\tilde{F}$ of the performance measure F. As shown in FIG. 5*b*, the expectation $\tilde{F}$ is given by the sum of the products of a) the probability of each given state occurring with b) the performance measure value computed for that state. Performability characteristic $\tilde{F}$ provides an indication of the extent to which a particular aspect of network service will be affected by the failure of network components. If F is a measure of something undesirable, the smaller the value of performability characteristic $\tilde{F}$ the better. If the network operator regards the value of performability characteristic $\tilde{F}$ to be unacceptably high, the network operator may take such steps as reconfiguring its network or providing the network with additional redundancy. As discussed in further detail below, an even more useful performance characteristic than just the expectation of performance measure F is a performability guarantee that, in the simplest case, could take the form "with 99.9% probability, at most 5% of the total traffic will not be able to be routed to its destination."

FIGS. 5*a* and 5*b* illustrate another computation of a performability characteristic F for the same network assumed for the illustration of FIGS. 4*a* and 4*b* except now taking into account the possibility of components with multiple failure modes. Specifically, it is assumed for this example that while components C1 and C2 each still have only one failure mode, $C1_1$ and $C2_1$, respectively, component C3 has three failure modes $C3_1$, $C3_2$ and $C3_3$, which are mutually exclusive. Failure modes $C1_1$ and $C2_1$ have respective probabilities P1 and P2 and failure modes, $C3_1$, $C3_2$ and $C3_3$ have respective probabilities $P3_1$, $P3_2$ and $P3_3$. Thus, in addition to the perfect state, there are, overall, 15 network failure states, as shown in FIG. 5*b*, having the state probabilities SP1 through SP15, performance measure values F1 through F15 and performability characteristic $\tilde{F}$ as shown.

In determining the effects on traffic, at the logical level, of the failures that characterize a particular network state, prior art approaches focus on the capacities of edges, as described above.

In accordance with one aspect of our method, we have recognized that more accurate performability characteristics can be derived by taking into account attributes of elements at the logical level other than just the capacities of edges. In particular, we have recognized that more accurate performability characteristics can be derived by taking into account in each analyzed network state a) attributes of edges for a given network state other than just their capacities and b) attributes of logical level elements other then edges. These will now be discussed in turn.

Attributes of Edges Other than Just Capacities

Figure 6A:
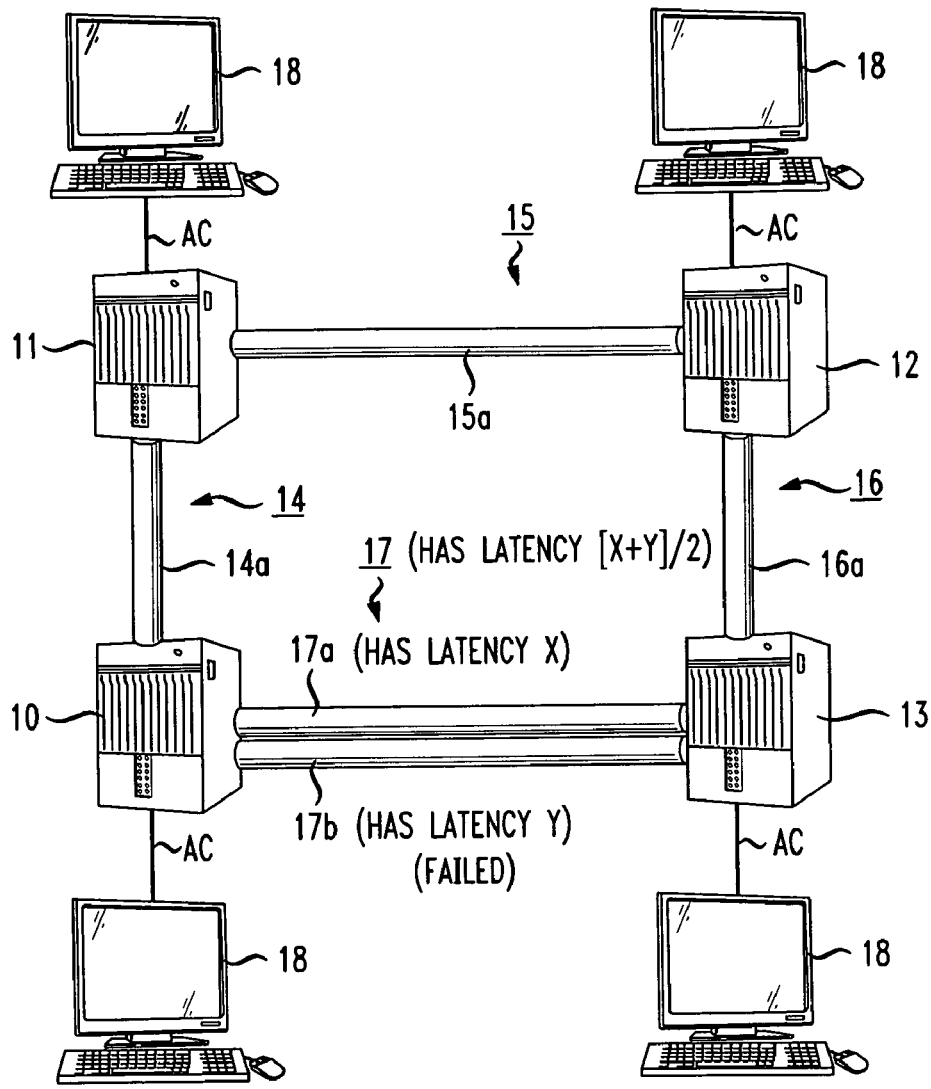
Figure 6B:
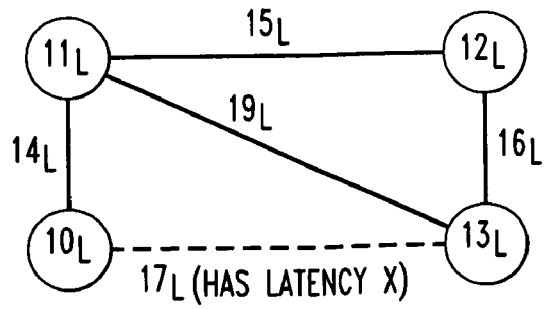
FIGS. 6b, 7b, 8b and 9b are logical level views of the network in the failure states depicted in FIGS. 6a, 7a, 8a and 9a, respectively.

FIGS. 6a and 6b illustrate taking into account attributes of edges other than just their capacities in deriving the various network states—specifically, in this example, latencies of edges.

Latency is the time it takes for a packet to travel from its point of origin to its point of destination. In the example of FIGS. 6a and 6b, optical cables 17a and 17b have latencies X and Y, respectively. Illustratively, traffic is equally likely, on average, to be on cable 17a or 17b, and so the latency of the overall link 17 is the average [X+Y]/2. Assume that a repeater associated with optical cable 17b has failed, taking cable 17b out of service. The latency of the link 17 thus changes from [X+Y]/2 to simply X, i.e., the latency of cable 17a. In accordance with our disclosed method, various network states that would be considered include states in which a) the latency of link 17 is its "normal" latency associated with all of its constituent cables being operative (in this example [X+Y]/2) and, alternatively, b) the latency of link 17 is its latency under the assumption of the failure of one or more of its constituent optical cables (in this example, X). Since latency is a factor in how well a network is performing, then the computation of various performability characteristics can be more accurately computed, pursuant to this aspect of our disclosed method, by including such network states when computing various performance measures that are involved in performability characteristics such as the average time for the network to route packets end-to-end.

The length of a route can also affect various measures of network performance. Thus the network states that are evaluated in computing various performability characteristics pursuant to this aspect of our disclosed method may include states in which the length of the edges of the logical network differ from "normal" as the result of failures.

Another example related to latency arises in the context of routes between nodes in an underlying network layer that is not explicitly included in the model, such as a SONET ring. Normally, traffic between two points A and B is routed in a particular direction around the ring. If a component in that direction should fail, the traffic between A and B could be re-routed in the other direction, which could be the long way around the ring, thus increasing the latency of the edge between nodes A and B of the ring.

Figure 7A:
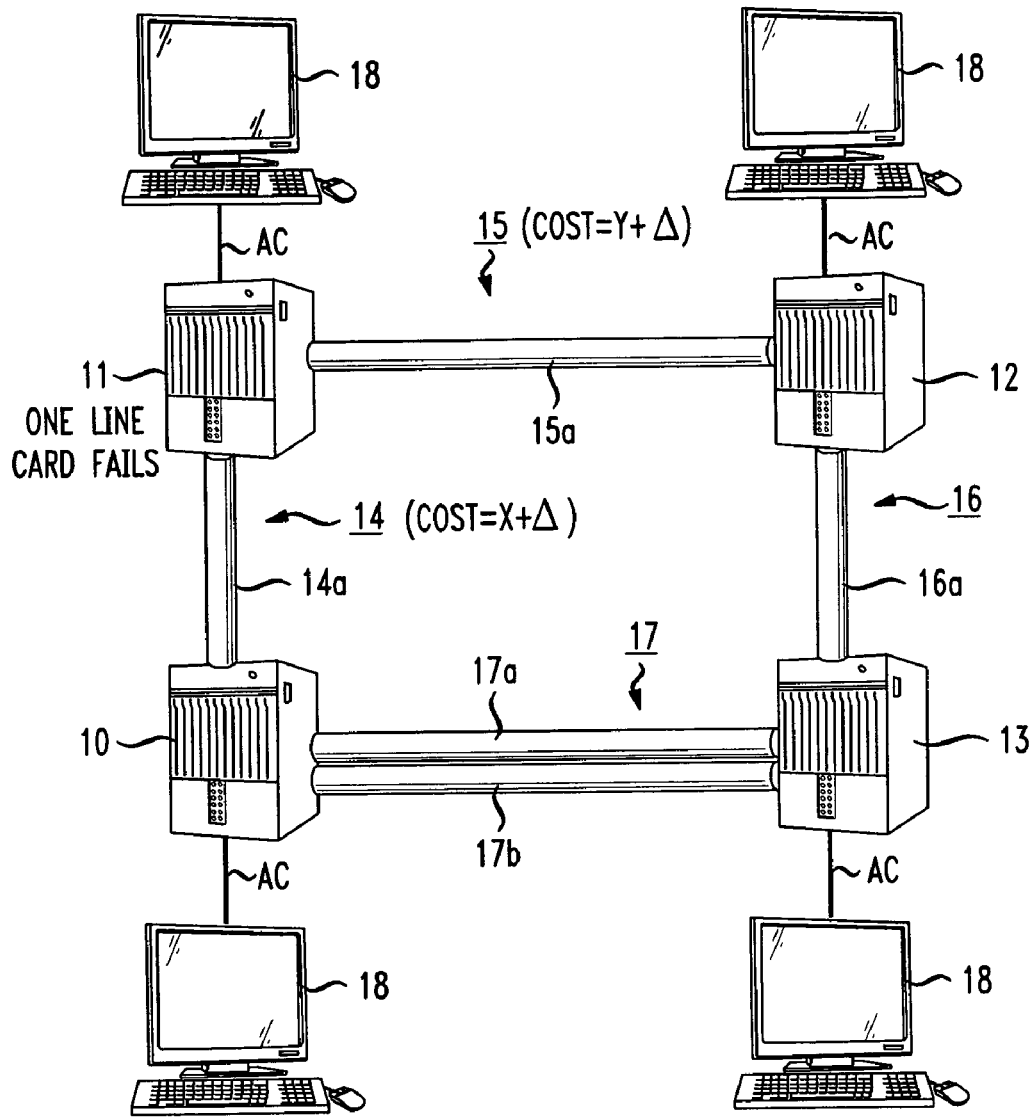
Figure 7B:
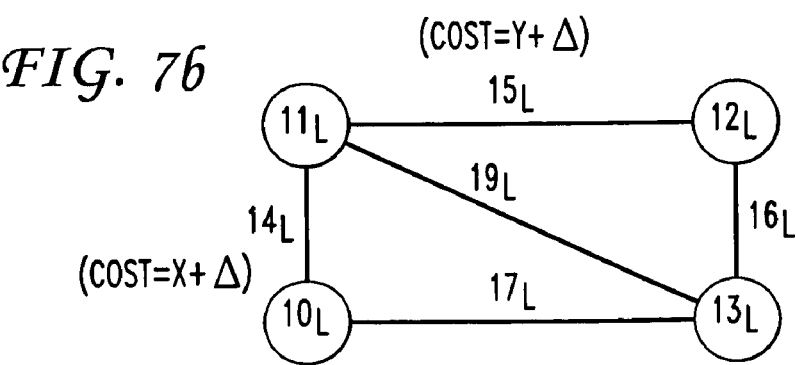

FIGS. 7a and 7b further illustrate the taking into account of attributes of edges other than just their capacities in deriving the various network states—specifically, in this example, the so-called "cost" (also called the "weight") of edges of the logical network.

Links in a network are often assigned a so-called administrative cost that is a function of, for example, the physical length of the link. Algorithms that determine routes through the network can take link costs into account in doing so, with the goal being to develop routes that minimize the use of network resources or to maximize throughput or to achieve some other goal. The routing algorithms are designed such that they tend to avoid routing traffic over links having relatively high costs. In addition to assigning baseline, or fixed, administrative costs to links, network management software can artificially increase a link's cost if for any reason it is desired to "discourage" a routing algorithm from routing additional traffic over that link.

For example, if one or more of a router's line cards fail, or if maintenance is being performed on the router, its packet-handling capabilities are reduced. In such a situation the network operator may simply take the router out of service for the period of repair or maintenance. A better operations policy is to discourage the routing of network traffic via the impaired router by increasing the administrative cost associated with all links to which that router is connected; this makes the routing algorithms steer traffic away from the router in question. An example is shown in FIGS. 7a and 7b. It is assumed that one of the line cards of router 11 has failed, with the result that network management software increased the costs associated with links 14 and 15 by an amount Δ.

Increasing the link costs is a better network operations policy because it effectively removes the router in question from the network, but still allows it to be used in the event that a failure elsewhere in the network is such that a demand affected by it has no path to its destination other than (being rerouted) through this impaired router. As an example, consider router 11L in FIG. 7b and assume that while this router is impaired, link 16 in FIG. 7a fails, thus removing edge 16L from the network of FIG. 7b. In this situation the only path for the demand from router 13L to 12L is via router 11L, despite the increased cost of this path. A performability evaluation method which, unlike this aspect of our disclosed method, does not allow increases of edge costs as the result of component failures, would represent this situation simply by removing router 11L from the network of FIG. 7b, and would erroneously conclude that the demand from 13L to 12L would be lost.

The above example is one in which an attribute of a link other than just its capacity is affected not by a failure on the link itself, but of some other component of the network. For another example, consider the loss of packets in a network employing radio, microwave, or laser links. Each link has a "packet loss probability" attribute, whose value is affected by components representing atmospheric conditions or conditions in space. The overall loss in the network is a function of these link loss attributes. The loss probability attribute may also depend on the available buffer (queue) space of routers to which the link is connected. Thus, if one of N buffers in a router fails, there is an increased probability of loss in the associated links since the probability that buffers will overflow, and thus the rate at which packets are dropped, is increased.

Figure 12:
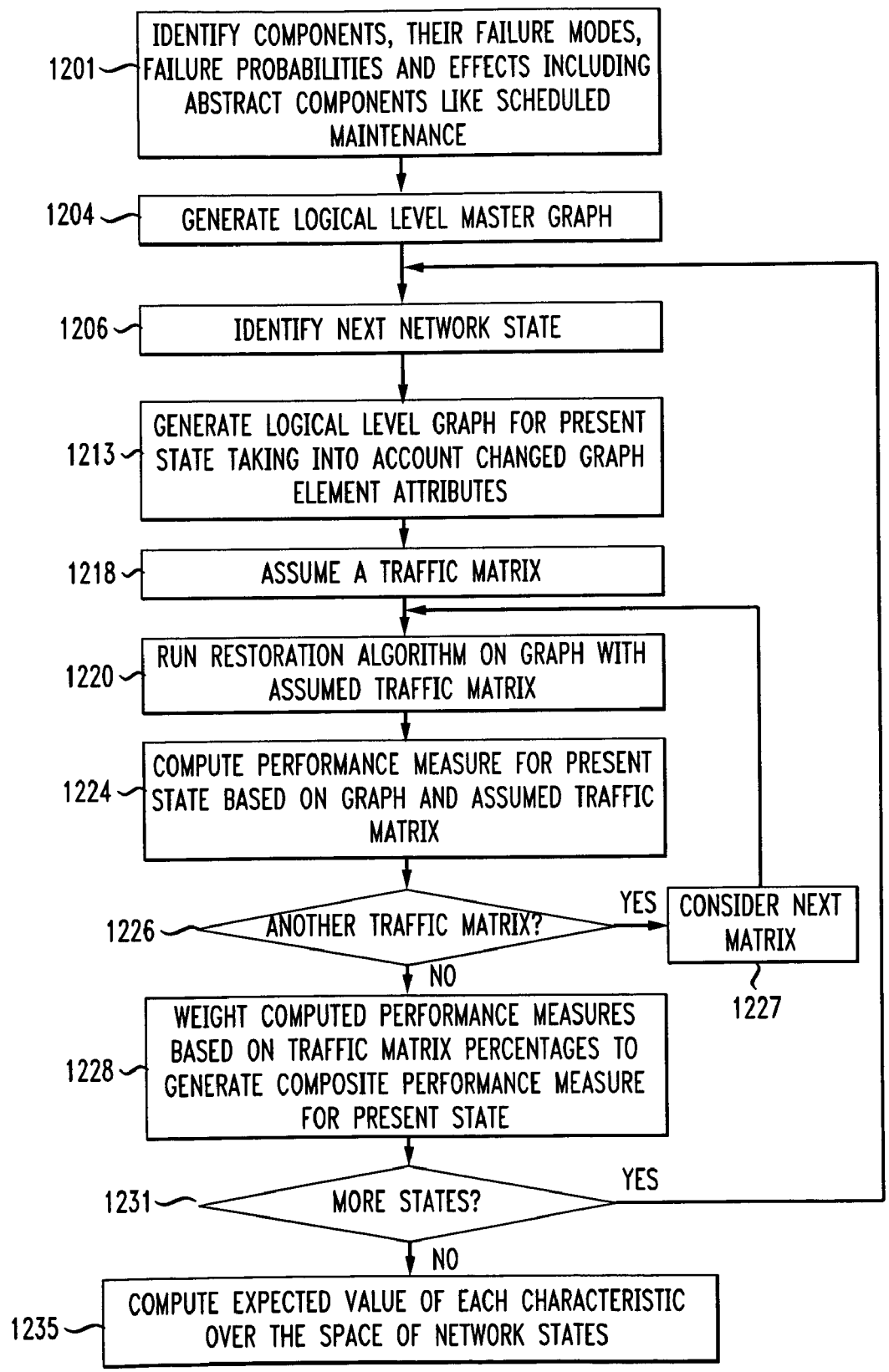
FIG. 12 is a flowchart of a process for computing a performability measure.

FIG. 12 is a flowchart of a process for computing a performability measure pursuant to the principles of our method. The process is structured similarly to the prior art process shown in FIG. 11 and discussed above. Indeed, each of the steps in FIG. 11 has a corresponding step in FIG. 12 and the last two digits of the reference numerals in the two Figures are the same for corresponding steps.

In accordance with this aspect of our disclosed method, however, step 1213 takes into account changed "graph element attributes" rather than simply changed link capacities at 1113 of the prior art method of FIG. 11. FIG. 12 thus reflects that our method allows for the possibility of considering attributes of edges other than just their capacities. Other differences between the processes of FIGS. 11 and 12 are discussed below.

Attributes of Nodes

The above examples are ones in which, pursuant to one aspect of our disclosed method, one or more attributes of edges other than just their respective capacities are taken into account in defining the network states. We saw how those edge attributes might be affected by a failure within the associated physical link and/or within some other network component.

Figure 8A:
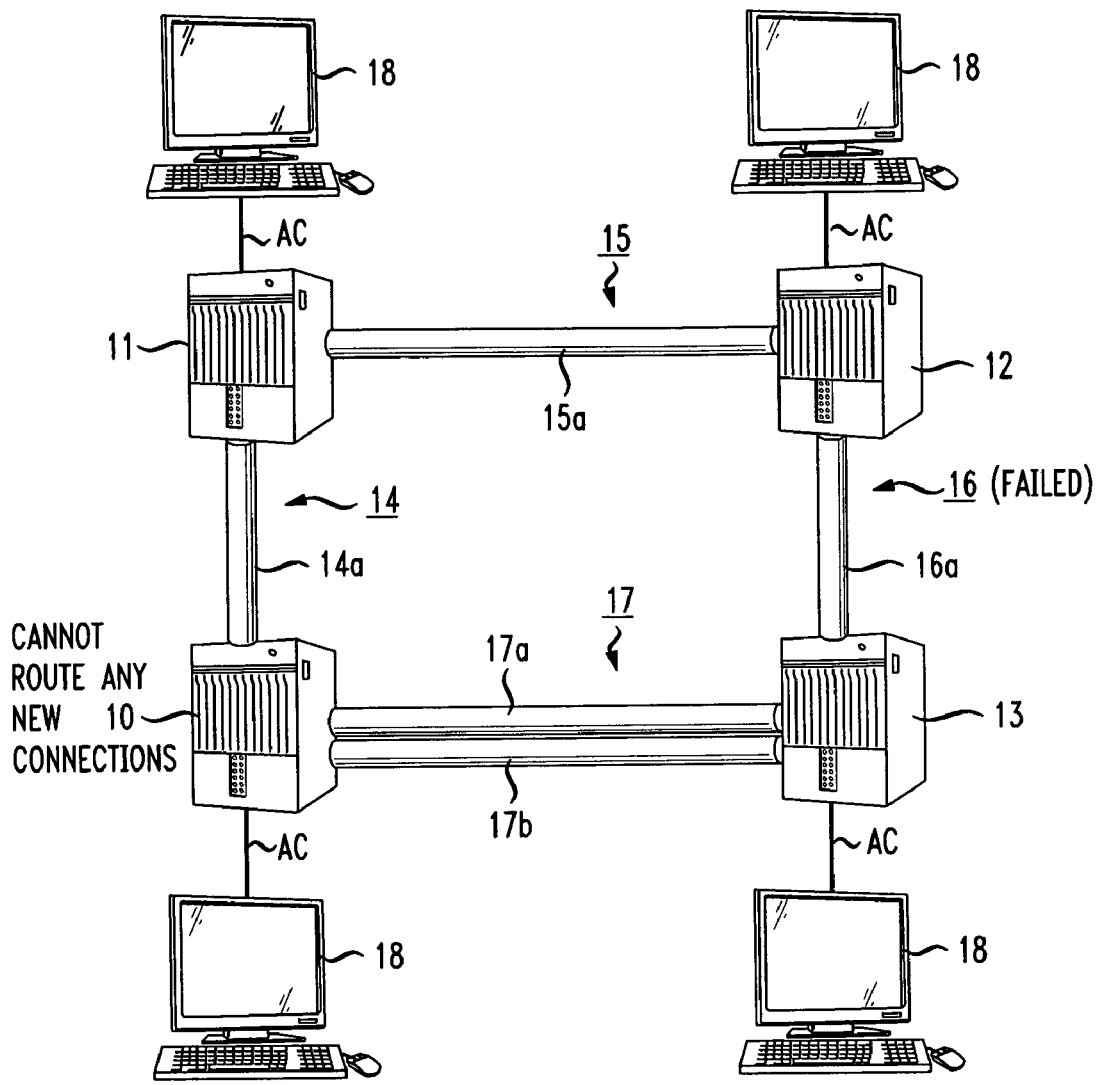
Figure 8B:
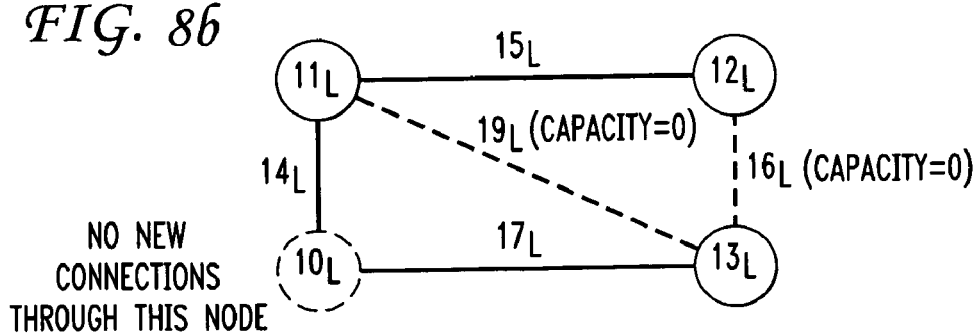

In accordance with another aspect of our disclosed method, however, the network states may include states in which a failure affects the attributes of a node. An example of such a state is depicted in FIG. 8a in which it is assumed that router 10 has failed in such a way that it cannot accept any new connections, even though it can continue to route packets of connections that were established before the failure. Thus in the logical network of FIG. 8b no new circuits can be routed through node $10_L$. Assume that at the same time as this failure, link 16 has failed. Assume also that logical path $19_L$ is routed via the physical route that involves links 16 and 15. If the aforementioned attribute of node $10_L$ were not taken into account, a performance measure such as percent traffic lost would be inaccurate because it would, erroneously, not be negatively impacted by the failure of path $16_L$. This is because the network's restoration algorithm applied to the logical network would assume a successful rerouting of that traffic from node $13_L$ to node $11_L$ over edges $17_L$ and $14_L$. In accordance with this aspect of our method, however, the network states include states in which node $10_L$ is unable to accept any new connections. In this particular example, then, the performance measure for this network state will, more accurately, reflect the fact that there is no available path between nodes $13_L$ and $11_L$, which will negatively impact on the percent traffic lost performability characteristic. Nice!

FIG. 12 reflects this aspect of our process, as well. As before, note that the method, at 1213, takes into account changed "graph element attributes" rather than simply changed link capacities at 1113 of the prior art method of FIG. 11.

Abstract Components

In accordance with an aspect of our method, we have recognized that more accurate performability characteristics can be derived by including in the component-level characterization of the network one or more of what we refer to as "abstract components." These are aspects of the network and/or its operation that can have the same kind of effect at the logical level—and thus on traffic and the performance measure—as an actual physical component failure.

Figure 9A:
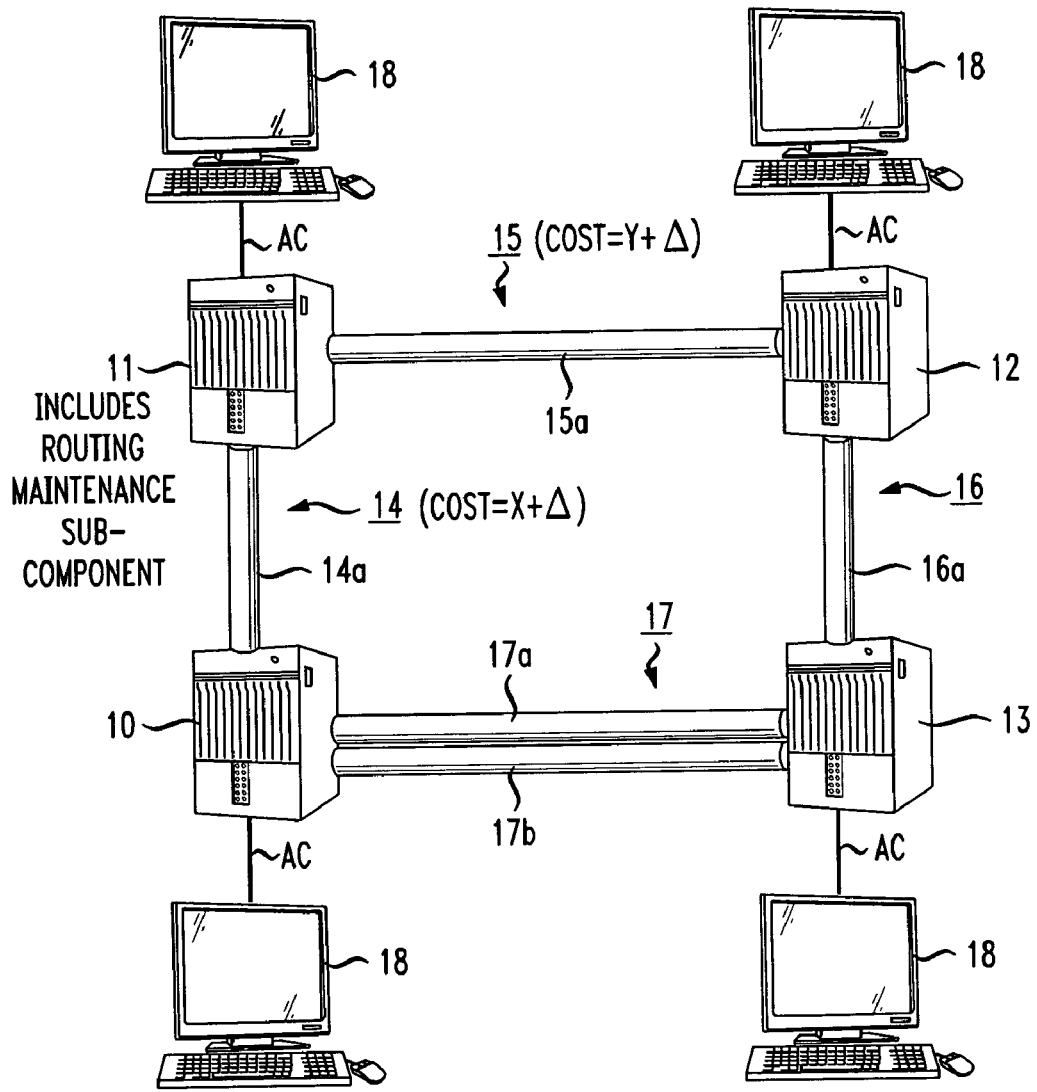

An example, illustrated in FIG. 9a, is a "scheduled maintenance" subcomponent of the network's routers. It is assumed in this example that a router under maintenance either has certain of its traffic-handling capabilities reduced or is taken out of service altogether, this having the same effect at the logical level as a total or partial failure of the router. The legend "includes scheduled maintenance subcomponent" is shown in FIG. 9a only for router 11 but would typically apply to all of the network's routers.

Figure 9B:
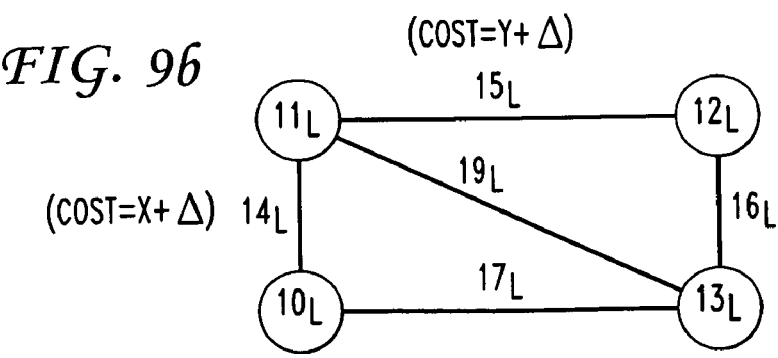

The scheduled maintenance of routers may be handled by network managers by artificially increasing to a very high number the "cost" assigned to all links connected to the router, so that the only way any traffic will go through this router is if a failure somewhere else makes paths using this router unavoidable. In the example where router 11 is undergoing maintenance, the costs of links 14 and 15, again assumed to be X and Y, would be increased by some amount Δ when the restoration algorithm is run on the logical network of FIG. 9b and the performance measure under consideration is computed.

As to the "probability" associated with the scheduled maintenance subcomponent of, say, router 11, assume that scheduled maintenance is carried out once per week for two minutes. The percentage of time that the router is in this effectively "failed" mode is then equal to the fraction of time that the router undergoes scheduled maintenance. Since there are 10,080 minutes in a week, that fraction is 2/10,080=0.000198, which is then used as the "probability" of this "failure" occurring. Advantageously, this abstract failure mode of the network's routers can be regarded, solely from a computational standpoint, as being just another one of the routers' failure modes, and among network states that are evaluated when computing a performability characteristic are network states in which a router has "failed" in this way.

FIG. 12 reflects this aspect of our process, as well. Note that at 1201 the process allows for the possibility of abstract components like scheduled maintenance.

Multiple Traffic Matrices

In accordance with another aspect of our method, we have recognized that more accurate performability characteristics can be derived by computing a performance measure using not a single traffic matrix but, rather, two or more traffic matrices.

As an example, FIG. 10 shows three traffic matrices I, II and II for a network illustratively having five origin/destination nodes, denoted 1 through 5. These traffic matrices could be derived from a network operator's observation that traffic patterns fall into three particular categories for the network in question: a) non-holiday weekdays from 7 AM to 6 PM (matrix I); b) non-holiday weekdays from 6 PM to 7 AM (matrix II), and c) weekends and holidays (matrix III). The three different traffic matrices depicted in FIG. 10 are associated with these three time periods which, depending on what counts as a "holiday," can be computed as comprising about 32%, 38% and 30%, respectively, of the hours in a year.

The amount of traffic from node 1 to nodes 2, 3, 4 and 5 during the time frame associated with matrix I is denoted b1, c1, d1 and e1, respectively. It is assumed that traffic between nodes may be asymmetric—that is, the amount of packet traffic from one node to another may be different in the reverse direction. Thus the amount of traffic to node 1 from nodes 2, 3, 4 and 5 during the time frame associated with matrix I is indicated separately, being denoted f1, k1, p1 and u1, respectively.

The traffic amounts indicated in matrices II and III follow a similar labeling scheme.

A first way of taking multiple traffic matrices into account is to compute the value of the performance measure F for each network state using each traffic matrix in turn. One can then amalgamate the resulting performance measure values F into a composite performance measure value for the network state under consideration, weighting them in accordance with the length of time over which the traffic associated with the various traffic matrices is assumed to subsist.

This first approach is illustrated in FIG. 12. A first traffic matrix is assumed at 1218 and the performance measure is computed for the present state based on the logic level graph and assumed traffic matrix (1224). The next traffic matrix, if there is more than one, is then considered (1227) and the performance measure is computed with that traffic matrix, and so forth. After the performance measures have been computed for each traffic matrix, they are amalgamated into a composite performance measure for the network state in question by weighting them by, in this example, the factors 0.32, 0.38 and 0.30 (1228).

Thus if a particular performance measure F3 for a particular state is computed to be $F3^1$, $F3^2$ and $F3^3$ for traffic matrices I, II and III, respectively, then the composite value of the performance measure F3 for the state in question would be given by $(0.32 F3^1 + 0.38 F3^2 + 0.30 F3^3)$.

A second approach for taking multiple traffic matrices into account is to define an abstract component—per the discussion of abstract components above—and to make the traffic matrix part of the network state. In this case the abstract component would be a traffic component. In any given network state the traffic component will be in (in this example) one of the three modes (corresponding to the three traffic matrices). The probability associated with each traffic mode used for computing the probability of the overall network state is the associated percentage of time that network traffic is characterized by that particular matrix.

The second approach may yield the same computed performability characteristic as the first if all of the possible network states are considered in the computation. If significantly less than all of the possible network states are considered in the computation, a different, but probably statistically insignificant, value of the performability characteristic might be expected.

There are, however, certain advantages to using the second approach. One of them is that if the implementing software allows for abstract components, as discussed above, the inclusion of different traffic matrices in the computation is readily accomplished without having to generate program code specifically directed to multiple-traffic traffic matrix considerations.

Moreover, in certain situations the second approach will yield a more accurate computation. As an example of that, assume that the software in the network's routers gets upgraded only when the network traffic is low (say between 2 AM and 4 AM). In that case, we want the abstract component "router software upgrade" to be correlated with low traffic. Indeed, the implementing software will typically already have been configured to allow for correlated component modes. Accordingly, those states in which the router is in software upgrade mode will always have the abstract traffic component in its mode associated with the time frame that encompasses 2 AM to 4 AM. That is, we will not consider any network state in the overall computation in which the router is in software upgrade mode but the traffic matrix is for a time frame that does not encompass 2 AM to 4 AM. This is correct to do because no such a state ever occurs in the postulated scenario. If, by contrast, the first approach, as shown in FIG. 12 were used, F would be computed using such non-existent states and, as such, would be less accurately determined.

Theoretical Underpinnings

1 Introduction

The balance of this Detailed Description presents some theoretical underpinnings of our disclosed method as well as further examples.

2 Network Performability Evaluation

We describe the problem of network performability evaluation in an abstract manner and, for clarity of exposition, restricted to networks with only binary components. More complex multi-mode models are discussed hereinbelow 2.1 The Theoretical Problem Let $C = \{c_1, \ldots, c_n\}$ be a set of "components", each of which is either in a working or in a failed state. A component may, or may not, correspond to an actual network element. In general, it is best thought of as representing some failure mechanism. Components associated with network elements may represent hardware or software that can experience failure. Other components may represent more complex possible combinations of events, such as a natural disaster, that bring down all network equipment in a certain geographical area. The main assumption about components is that $c_i$ fails with probability $q_i$ independently of any other components.

A state of the network is an assignment of a state to each component and can be thought of as an n-bit vector. The set of all network states S (C) has size $2^n$, and the probability of a particular state is the product of the state probabilities of the n components. Let F (•) be a vector-valued performance measure (function) defined on S (C), mapping each state to an m-tuple of real numbers; see §4 for examples.

The most basic characteristic of F is its expected value over the space of network states:

$$\bar{F} = \sum_{s \in S(C)} F(s) Pr(s). \tag{2.1}$$

Our main purpose is to compute more sophisticated characteristics of F than just its expectation. These are performability guarantees which, in the simplest case have the form, e.g., "with 99.9% probability, at most 5% of the total traffic is down," and in a more complex case the form "with 99.9% probability at most 5% of the total traffic is down, and with 99.99% probability at most 10% is down." Formally, these guarantees are statements of the type $$Pr(F < x_1) \geq p_1, Pr(F < x_2) \geq p_2, \ldots, \text{ or}$$

$$Pr(F < y_1) \geq q_1, Pr(F < y_2) \leq q_2 \tag{2.2}$$

that apply to the entire space S. These guarantees, referred to as "multi-part performability specifications" are much stronger and more useful than just the expectation (2.1). For instance, they can be used to set, or to check, service-level agreements (SLAs) for the network. An alternative assessment uses multi-attribute risk, examined in §4.4.

What is the meaning of $\bar{F}$ if the components in C represent physical units that can fail and be repaired? If a component is represented by a 2-state Markov process, then S is the state space of a large Markov chain, defined by the parallel composition of the n independent 2-state processes. Then it is easy to see that the limiting average of F over time as the network moves through its states is precisely the $\bar{F}$ of (2.1), if we take the failure probability of $c_i$ to be the steady-state probability that the ith Markov chain is in its failed state. When the individual Markov processes are ergodic (always true for the network processes we see in practice), then the probabilities in (2.2) have similar interpretations as limiting time averages, i.e., yield the long-term fraction of time over which the corresponding statements, F<x or F>y, are true.

2.2 Approximate Evaluation

Since the size of S (C) is normally very large, the straightforward computation of (2.1) or (2.2) is generally prohibitive. The complexity of the Performability Evaluation problem Given a set C and a polynomial-time computable function F (•) defined on S (C), compute the expectation $\bar{F}$ defined by (2.1), depends on F. Even for very simple F this problem is computationally difficult. For example, it contains as a special case the #P-complete problem of Two-terminal Network Reliability evaluation, which asks for the probability of there being a path between vertices s and t of a graph whose edges are subject to failure with some probability. Various ways of approximating $\bar{F}$ are known in the literature. They can be classified into (a) upper and lower bounds, for certain F such as connectivity, and special network structures (b) "most probable states" methods, (c) Monte Carlo sampling approaches and (d) probabilistic approximation algorithms for simple F. Methods of types (a) and (b) produce algebraic bounds on $\overline{F}$, while (c) and (d) yield statistical bounds. Here we adopt the "most probable states" methods, which are based on the observation that if the component failure probabilities are small, most of the probability mass of S will be concentrated on only a few out of all the possible states (equivalently, there will be many failure states of low probability). Then, the challenge is to conceive methods to allow tractable computation of these states within a probabilistic, pre-specified "precision". Let $\omega$ and $\alpha$ be the smallest and largest values of F over S. Given a set C, suppose we generate the k highest-probability states, and they have total probability P. Then we have algebraic lower and upper bounds on $\overline{F}$ $$\overline{F}_l = \sum_{i=1}^{k} F(s_i)Pr(s_i) + (1-P)\omega, \qquad (2.3)$$

$$\overline{F}_u = \sum_{i=1}^{k} F(s_i)Pr(s_i) + (1-P)\alpha.$$

By viewing states as sets of failed components, F is monotone increasing if $F(s) \leq F(s')$ whenever $s \subset s'$, and monotone decreasing if $F(s) \geq F(s')$. It is possible to improve the bounds of (2.3) for monotone measures F. The particular performance measures we use here are defined in §4 and we show that some, but not all, are monotone.

A generalization of most probable states is the notion of "most important states", i.e. those which contribute the most to the value of $\overline{F}$. We did not adopt this—in principle more powerful—approach, because determining the states on which the function F takes large values (a) is difficult for the F and types of network of interest here (cf. §4), and (b) depends strongly on the network design and so does not generalize to the degree we require. Further, for the kinds of networks we will encounter in practice, our experience with the most probable states method is that usually the values of F and the probabilities of the states are such that states are in fact generated in most important order.

State generation algorithms There are two fundamentally different types of algorithms for generating states in order of probability.

One type of algorithm views the space S as a partially-ordered set (lattice), while the other treats it as a binary tree. Both these algorithms work only on systems of binary components, and they are best suited to different problem domains. For a monotone F, the second algorithm produces better bounds on $\overline{F}$ than those of (2.3). Equivalently, this algorithm will need to explore fewer network states to achieve a given accuracy on $\overline{F}$. However, the algorithm works only for monotone F, and it consumes a large amount of memory, which depends strongly on the size of C; this usually renders the algorithm impractical on large network models. When we have non-monotone measures and large networks, we use the first algorithm that is applicable to any measure, monotone or not, at the expense of the looser bounds (2.3), but whose memory usage is a very weak function of the number of components in C. Finally, for models that include components with more than two failure modes, we present a new algorithm described in §2.3.

Bounds on the CDF So far we have discussed bounds only on the expectation of a measure F. The same techniques allow us to derive bounds on the performability guarantee $Pr(F \leq x)$, (CDF of F) for a given x. Let the notation [C] yield 1 if the condition C is true and 0 otherwise. Then $$Pr(F \leq x) = \sum_{s \in S} [F(s) \leq x]Pr(s)$$

is a sum of the form (2.1), so bounds of the type (2.3) can be found for it as well (recall that P is the probability of the k highest-probability states):

$$\sum_{i=1}^{k} [F(s_i) \leq x]Pr(s_i) \leq Pr(F \leq x) \leq \sum_{i=1}^{k} [F(s_i) \leq x]Pr(s_i) + 1 - P. \qquad (2.4)$$

2.3 A Hybrid State Generation Algorithm

Our experience indicates that many practical telecommunications networks can be adequately modeled by binary components together with a relatively small number of components with multiple failure modes. There is no satisfactory state generation algorithm for such a system. To our knowledge, the so-called GC algorithm is the most efficient for systems of purely binary components, but cannot handle any non-binary components. Other algorithms work with multi-mode components, including binary, but they are not nearly as efficient as the GC algorithm in the purely binary case.

A method is known for combining an arbitrary binary algorithm (for binary components only) and an arbitrary multi-mode algorithm (for any components) into a hybrid algorithm which works for combinations of binary and non-binary components, but is particularly efficient for mostly binary s stems of components. By "mostly binary" we mean such that the number of binary failure modes is at least as large as the total number of multi-mode failure modes. All state generation algorithms that we are aware of use a priority queue which stores network states according to probability, and a set of rules for generating next states from a current state. The hybrid algorithm follows the same pattern, and is described in FIG. 13; the concept of 1-states is central to the algorithm, and will be defined shortly. Note that the multi-mode algorithm M chosen for incorporation into the hybrid scheme needs a slight generic modification; we denote the modified algorithm by M'.

Efficiency We now present a more complete discussion of the efficiency of the hybrid algorithm. Given the components $C = \{c_1, \ldots, c_n\}$, we define a network state to be an n-tuple of (component id, mode) pairs. If a component has $\mu$ failure modes, we denote their probabilities by $p_0, p_1, \ldots, p_\mu$, where $p_0$ is the probability of the working (non-failure) mode. We assume that each component's modes are arranged in order of decreasing probability, so $p_0 > p_1 \geq p_2 \geq \ldots$. A 1-state is a state in which all components are in mode 1, their most probable failure mode.

Notice that for a given set C and $\epsilon > 0$ any algorithm, hybrid or not, for generating states in order of probability, will produce exactly the same sequence of states (ignoring the ordering of states with equal probabilities). So the algorithms M and (B, M') will generate the same $s_0, s_1, s_2, \ldots$ when run on C. The gain of the hybrid (B, M') over the M comes from lines 6 and 7 in FIG. 13, and is based on the assumption that B generates 1-states more efficiently than M. The gain is quantified by the fraction of states among $s_0, s_1, \ldots$ that are 1-states. This fraction is difficult to calculate, but, intuitively, it can be claimed to be close to 1 as follows: Let $S_k$ be the set of states consisting of k failed components. Then Claim 1 A 1-state in $S_k$ involving a particular set of k components is more probable than any other state in $S_k$ involving these components.

Claim 2 For small k, a lot of the states of $S_k$ are 1-states. Claim 1 follows from the assumed ordering of the mode probabilities. To substantiate claim 2, suppose C contains b binary components and m multi-mode components, which have a total of M failure modes. 1-states with k components can be formed by choosing k out of b+m failure modes. Any state with k components can be formed by choosing k out of b+M failure modes, but choices involving two or more modes among the M that belong to the same component will be invalid. Therefore $$\frac{\text{no. of 1-states in } S_k}{\text{no. of all states in } S_k} > \frac{\binom{b+m}{k}}{\binom{b+M}{k}} > \left(\frac{b+m-k+1}{b+M-k+1}\right)^k. \quad (2.5)$$

In a "mostly binary" network as defined above we have b>M, and for relatively small k the ratio in (2.5) is comparable to 1, approaching 1 as b becomes larger with respect to M.

E.g., for $k \leq 3$, if M=b/10, the ratio is $\geq 0.75$ for $b \geq 100$.

Now if M is comparable to b, the fraction of 1-states in $S_k$ is going to be smaller, but in any practical situation, we only generate a small subset of states. Because the 1-states have high probabilities, we can make an intuitive argument that 1-states form a large percentage of the generated states $s_0, s_1, \ldots$.

Suppose we sort all b+M failure modes in the decreasing order of probability. A network state corresponds to a subset of these modes and its probability is proportional to the product of the corresponding mode probabilities. Let us consider the states in $S_3$ in a system with b+m=500 components. There are more than $2.5 \cdot 10^6$ triplets formed out of the first 250 modes, and in any practical situation we expect most of the states to be formed out of these first 250 modes. This can be seen as follows: the mode probabilities of any $c_i$ are in decreasing order, so a large number of the first 250 modes will be mode 1. If, for example, 80% of them are mode 1, then the fraction of 1-states among all triplets formed out of the first 250 modes is about $(0.8)^3 \geq \frac{1}{2}$ (think of selecting a mode at random out of 250).

In other words, more than half of the states of $S_3$ that are generated will be 1-states. FIG. 14 substantiates this argument by showing the experimental maximum queue length as a function of the number of generated states in a network that is not "mostly binary". The black points show the behavior of the binary algorithm on a system with 500 purely binary components. The red points (lower) show the behavior of the hybrid algorithm on the same system, but where 50 of the components have been made to have 10 modes each. Each algorithm is run with 50 randomly-selected values of $p_0$ in [0.999, 1), and the failure modes of the multi-mode components have equal probabilities. It can be seen that the efficiency of the hybrid algorithm is competitive with that of the binary algorithm.

2.4 General Context

To gain some perspective on what has been said so far and to understand some of the compromises involved, it is useful to consider performability evaluation in a general setting. Ideally, one would like to model the network under consideration as a system of (perhaps interacting) components $c_1, \ldots, c_n$. Each component would be represented in some powerful formalism, e.g. as a stochastic Petri net or a stochastic automaton. Such component models would allow representing aspects of the real network that were idealized in the description of §2. These formalisms also permit the specification of a performance measure, often called a "reward", on the states of the system. There are well-developed methods for analyzing such systems exactly when the number of components is small, and approximately when it is large. In the best case, the combination (composition) of the component models is translated into a large Markov chain, which is then solved numerically, either exactly, or with some state-space "pruning". When reduction to a Markov chain is not possible, the resulting model is a discrete-event system. Although some special cases (regenerative) can be solved numerically, such a model must, in general, be dealt with via simulation. In all cases, the difficulty of the analysis increases with the size of the model and with the precision of the results that one wants: averages of measures are the easiest to compute, probability distributions are more difficult, and probability densities are even more difficult. Also, it is much easier to do all this with the system in steady state, as opposed to considering its evolution (dynamics) in time.

There are two difficulties in applying such methods to our network performability evaluation problem. First, the number of components is large: $n \approx 700$ is not unusual, leading to a large state space. Second, our performance measure is complex: it involves a multi-level network model (cf. §3), and the execution of a complicated network restoration algorithm (cf. §5). Of these, the second is the most difficult: the simpler the performance measure defined on the system, the easier it is to deal with the size of the system (e.g. by some approximation or reduction technique) and its evolution in time, and the more detailed one can make the models for the individual components. So the formulation of §2 reflects a compromise, where we have basically traded off accurate representation of the network and its dynamics (2-state models for the components, assumption of steady state, assumption that multiple failures occur at a single instant in time and restorations are single events) in order to be able to handle the complexity of the mechanisms involved in the performance measure. The remainder of this discussion will clarify these assumptions.

3. Hierarchical Network Model

FIG. 16 shows two views of a network: a view of the "real" network, and the view adopted by the performability model. Each view consists of a number of levels, and the figure indicates the correspondence between them. The real network view is divided into traffic, transport, and physical layers. These are commonly-used terms in the networking field; we clarify later the sense in which we use them. The l.h.s. of FIG. 15 uses the example of an IP network carried over an optical transport layer, but this could also be an entirely different type of network, such as satellites communicating among themselves and with ground stations via microwave links, with the ground stations interconnected by a circuit-based network.

The performability model view has a demand level, a graph level (multigraph, in general), a component level, and a reliability level (not to be confused with network layers). The demand level specifies the amount (and possibly type) of traffic flowing from one node of the graph to another via the graph's edges. The graph is the level at which the network routing and restoration algorithms operate, so graph edges have associated capacities and (routing) costs.

At the component level, each component corresponds to an independent failure mechanism, as explained in §2; failure of a component may affect a whole set of graph-level elements. The components may, in fact, have an arbitrary number of failure modes; see §3.2 and §3.3. In general, the effect of a component entering one of its failure modes on a graph node or edge is to change some of its attributes. For example, the capacity of an edge may decrease, or a node may become unable to perform routing. Depending on the final values of the attributes, e.g. edge capacity 0, the graph element may be considered "failed". Finally, at the reliability level, failure modes of components are described simply by their mean times between failures and mean times to repair.

The model view in FIG. 15*b* implicitly assumes that network restoration happens at only one level. If we had a network employing optical-layer restoration in addition to the IP-layer restoration, FIG. 15*b* would be extended by adding another "optical" graph level between the component and graph levels. Then components would be associated with elements at the optical graph level and restorations would happen at both of the graph levels.

3.1 Example Model for an IP-Over-Optical Network

Today's typical commercial packet network consists of IP routers whose links (between the routers) are transported by an underlying optical network. For such a network we illustrate how we model the layers FIG. 15*a* and then map them to a model in FIG. 15*b*.

Traffic layer Based on an estimate of the peak or average traffic pattern, we create a matrix giving the demand (typically called "flows") between each pair of routers. A demand has a rate, and possibly a type associated with it.

Transport layer nodes A network node represents an IP router which contains a data plane, a control plane, and ports. The data plane, or switching fabric, is responsible for routing packets, while the control plane computes routing tables, etc. We model the data and control planes as separate components, because newer routers have the ability to continue forwarding packets even when the control plane fails.

The nodes of the graph level model represent routers. At the component level this node explodes into one data plane, one control plane, and one hardware and software upgrade component. When a data plane component fails, all the graph edges incident to its node fail. When a control plane component fails, the existing flows are unaffected, but the node cannot participate in restoration. We also model components for each port of the network node. Failure of a port component brings down the corresponding edge(s). Finally, at the reliability level we specify an MTBF and an MTTR for each class of component.

Transport layer links Two network nodes may be connected by multiple parallel links. These are modeled at the graph level by parallel edges. For the purposes of IP routing, these parallel edges may form an "aggregate" link whose capacity is the sum of the capacities of the edges, and the nodes see only the aggregate links. When a constituent edge fails, the capacity of a link is reduced; the link fails if and only if all its constituent edges fail. As stated earlier, edges fail if the corresponding port components fail. Edges can also fail because of network span failures, discussed next.

Physical layer spans: We use the term "span" to refer to the network equipment at the physical layer that carries the transport-layer links. We define a component for each network span. Failure of this component affects all graph-level edges which are routed over this span.

When the optical layer uses Dense Wavelength Division Multiplexing (DWDM), a span consists of a concatenation of point-to-point Optical Transport Systems (OTS) (more complex WDM systems have various optically transparent "add/drop" capabilities which, for simplicity, we do not discuss here). In turn, an OTS is composed of optical multiplexers and demultiplexers, optical amplifiers, and optical transponders.

The length of a span and the maximum permitted distance between optical amplifiers determine how many OTSs need to be concatenated. To avoid proliferation of components, we do not define a component for each piece of equipment appearing in a span, but represent the entire span by a single component; this component may affect multiple edges, as many as the number of wavelengths.

A basic assumption about spans in typical transport networks is that they are considered to be working only if both directions of the span are working. With this assumption, it is not difficult to compute the failure probability of a span based on the failure probabilities of its individual components. However, at the reliability level we want a more detailed characterization of a span, in terms of an equivalent failure rate A (MTBF) and an equivalent repair rate M (MTTR). Since both directions of a span must be working for the span to be operational, we can represent the whole span by laying out the components of both directions into a series connection of independent blocks. The MTBF and MTTR of this connection are then calculated as explained in §3.3.

Other components We may also have other components, in addition to the above types. For example, a bundle of fibers that is likely to fail together because they are in a single conduit can be represented by a component that brings down all graph edges carried by this fiber bundle. Other types of catastrophic failures of entire sets of graph nodes and edges may be similarly represented.

Simplifying the graph-level access topology Commercial transport networks are usually partitioned into "access", and a "backbone" or "core" segment. The topology of the access to the backbone or core is the most complex part of the network, with many details that are very difficult to model. Moreover, it undergoes frequent changes, as older equipment is replaced by newer equipment and customer interfaces change. To analyze the availability and performance of the backbone segment of our IP-over-Optical example network, at the graph level we create a simplified model (and hence the accompanying network "roll-up" approximation) of the access topology based on the point-to-point demands and assume only a single type of router port at the SONET OC-48 (2.5 Gb/s) rate. The model is created as follows.

Given a backbone office, we go through all the demands originating from it and try to fit them into as few ports as possible. These become the "customer-facing" ports of the location. We then distribute these ports into groups of a certain size, which is a parameter. Each group is assigned to a virtual edge node, which has the same structure as an ordinary node: it contains ports, both customer- and network-facing, a data plane, and a control plane.

The network-facing ports of an edge node and the links to backbone nodes are determined by the network design, as described in §6.

3.2 Attributes for Graph Elements, Multi-Mode Components

A distinguishing feature of our model is that it allows graph nodes or edges to have any number of (possibly vector-valued) attributes, whose values can be set by components. Having such attributes at the graph level greatly increases the representational power of the model. As an example, consider modeling what is known as a "composite network link". Such a link represents a set of parallel edges which, for routing purposes, is treated as a single edge, with capacity equal to the sum of the constituent capacities, and which fails if some of its constituent links fail and its composite capacity becomes less than a certain threshold. Suppose we want to model a composite link that consists of two edges $e_1$, $e_2$, each of the same capacity c. In the real network $e_1$ can fail because of a failed "port" component $p_1$, $e_2$ because of a failed port $p_2$, and both edges can fail because of a failed "span" component s, as shown in FIG. 16*a*.

We can calculate F in a binary model by examining the states of $p_1$, $p_2$, s and implement the truth table of FIG. 16*b*. But then the code for the table is hard-wired into F, and if the network design changes, the code has to be modified. On the contrary, our model allows us to define a 2-element capacity attribute for the link, with the convention that the link's capacity is the sum of these two attributes. Then if $p_1$ sets cap[1] to 0 and $p_2$ sets cap[2] to 0, whereas s sets both to 0, the composite link can be correctly modeled. Graph element attributes also have other capabilities not covered in this example.

The use of components with multiple failure modes is not new in performability analysis, so here we just mention an example in the IP networking context. Upgrading the software of a router results in a short outage for the router. To minimize these outages, the commercial network maintenance policy is that only a single router is upgraded at a time. We model these mutually exclusive "failures" by using a component that, for an n-router network, has n+1 modes, with mode i corresponding to upgrade of the ith router and the last mode representing no router in upgrade state.

Our model also allows the combination of multi-mode components and (vector) graph element attributes.

3.3 Markov Models for Components

Each component of the network model is represented by a simple continuous-time Markov process with states G and B ("good" and "bad"), and parameters λ and μ. (failure and repair rates), as shown in FIG. 17.

Note that the multi-mode model assumes that every failure is followed by a return to the working state. We use these models for components that correspond to a single piece of equipment, as well as for components that represent a connection of several pieces of equipment in series, e.g. the spans of §3.1. In the first case λ and μ are directly available from the MTBF and MTTR of each mode, but in the second they are calculated, as follows.

If we have a series connection of k independent binary blocks, the corresponding Markov model has a single "up" state and $2^k-1$ "down" states. We approximate this model by a 2-state model of the form shown in FIG. 17*a* as follows. The 2-state model has states G and B. G corresponds to the single working state of the $2^k$-state model, and B to the set of failure states. Let π(G) be the steady-state probability of state G and π(B) the sum of the steady-state probabilities of the states in B. Then the parameters of the 2-state model are $$\Lambda = \sum_i \lambda_i, \quad (3.1)$$

$$M = \Lambda \frac{\pi(G)}{\pi(B)},$$

where $$\pi(G) = \prod_i \frac{\mu_i}{\lambda_i + \mu_i}.$$

and $\lambda_i$ and $\mu_i$ are the failure and repair rates of components 1, . . . , k. When $\lambda_i \ll \mu_i$, the above yields $\pi(B) = q \approx \Sigma_i q_i$, i.e., as expected, the failure probability of the series system is close to the sum of the failure probabilities of the k blocks. This approximation has two desirable properties: (a) the corresponding steady-state probabilities of the original and aggregate models are equal, and (b) the exponential sojourn time of the 2-state model in each of its states equals the approximately exponential sojourn time of the original model in each of the sets G and B. (The derivation of (3.1) involves the details of the 2-state approximation.)

4. Performance Measures and Risk 4.1 Traffic Measures

Given a network specified by the hierarchical model of §3, we define the following performance measures on every network state s:

$t_{aff}(s)$=traffic affected in state s,
$t_{fail}(s)$=traffic over failed edges in s, (4.1)
$t_{lrt}(s)$=traffic lost because of no route in state s,
$t_{lcg}(s)$=traffic lost because of congested edges in s.

Here "traffic" means the sum of the corresponding demands. A demand is affected when an edge on its route fails. A demand fails when a link (multiedge) on its route fails. A failed demand is lost, and remains so if no path for it has been found after the restoration process completes.

If the network routing allows congestion, the total traffic lost because of congestion can be computed by finding the maximum possible total flow F that can be carried without congestion and subtracting it from the total traffic in the network. Let D be the set of all subdemands (a demand may be split routed over multiple paths; we refer to each of these as a "subdemand"), and $D_e$ the set of subdemands using edge e under the given routing. Also let $f_d$ be the flow corresponding to subdemand d. Then F is computed by solving the linear program $$\mathcal{F} = \max \sum_{d \in D} f_d \text{ subject to } \forall e \sum_{d \in D_e} f_d \leq c_e U_c, \quad (4.2)$$

$$f_d \leq v_d,$$

where $c_e$ is the capacity of edge e, $U_c \in (0,1]$ is the congestion threshold, and $v_d$ is the volume (size) of demand d. Finally, $t_{lcg} = \Sigma_{d \in D} v_d - \mathcal{F}$.

However, for IP networks, in general this provides a crude estimate of packet loss, because packet loss depends on a model for the traffic, a queuing model for the nodes, and details of the protocol. E.g., TCP will "throttle down" traffic as soon as it detects congestion, so that packet loss is mitigated; in that case it is more accurate to call the tlcg measure as computed above "loss in network bandwidth".

4.2 Monotonicity

Figure 18A:
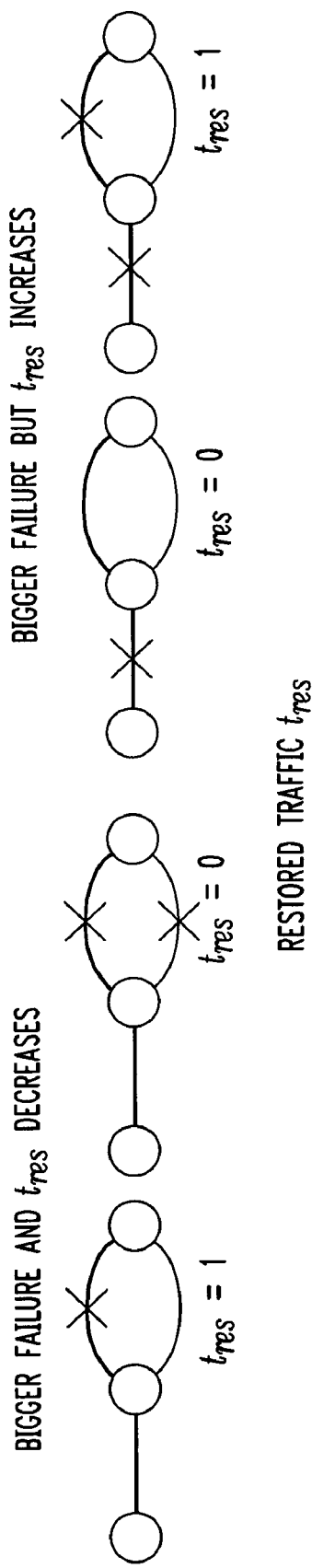
Figure 18B:
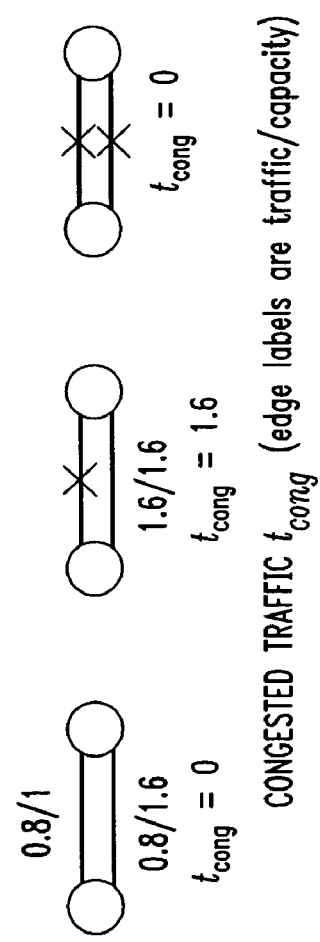

Whether a traffic measure is monotone or not (as defined in §2) depends both on the measure itself and on the routing/restoration method used by the network. It is clear that the measure $t_{aff}$ of (4.1) is monotone increasing, and so are $t_{fail}$ and $t_{lrt}$. This is so for both of the shortest-path and "optimal" restoration schemes considered in §5. However, in general the determination of monotonicity needs to be done carefully because intuition can be misleading. For example, the natural measure $t_{res}$, the amount of traffic that is affected and successfully restored in state s, is not monotone: consider the example in FIG. 18 with a unit demand on each of the heavy arcs. The traffic is defined to be restored if there exists a non-failed path between the source and destination (therefore the exact restoration method is irrelevant). The figure also shows that congested traffic is non-monotone, again irrespective of the restoration scheme. Hence the same holds for the measure $t_{lcg}$ of (4.1)

4.3 Incorporating Time

When computing the measures in (4.1) we also want to take into account the duration τ of a failure as well as the time $τ_r$ needed for restoration to complete. To do this, we will use the generic term "bad" traffic for the measure of interest. Let $D_{bb}(s)$ be the set of demands in s that are bad after the failure but before restoration, and $D_{ba}(s)$ the set of bad demands after restoration. These two sets may intersect. If $t_{bb}(s)$ and $t_{ba}(s)$ are the traffic rates corresponding to $D_{bb}(s)$ and $D_{ba}(s)$, the bad traffic as a function of time is depicted in FIG. 19. In practice, $\tau_r$ is usually much less than $\tau$. The duration $\tau$ of state s is distributed exponentially with mean $\tilde{w}_s$, the mean waiting time of the Markov process in s (recall §3.3). It can be shown that the expectation of the bad traffic in this state with respect to $\tau$ is $$\bar{t}_b(s)=t_{bb}(s)+(t_{ba}(s)-t_{bb}(s))e^{-t_r/\tilde{w}_s}. \quad (4.3)$$

For example, when "lost because of congestion" is substituted for "bad" and the appropriate "before" and "after" sets of demands are computed, the result of (4.3) is to be taken as the value of $t_{lcg}(s)$ in (4.1).

The analysis just given clearly involves some idealizations. For example, the set of demands $D_{bb}(s)$ actually changes during the restoration process; hence $t_{bb}$ also changes and is not constant as implied by FIG. 19.

4.4 Risk and the Pareto Frontier

Given a set of measures such as the ones in (4.1), one way to assess the performability of a network is to check if their CDFs satisfy certain requirements, the performability guarantees of (2.2). An alternative to looking at performability guarantees is to examine the space of explored failures from the viewpoint of risk.

Given a performance measure, let the risk of a failure with respect to this measure be the product of the probability of the failure and the value of the measure. With an m-dimensional measure, the risk associated with a failure has m aspects, or attributes. An immediate question is "what are the riskiest failures for the network?" Because of the multiplicity of attributes, the set of network states cannot be totally ordered with respect to risk, and there will usually not exist a failure that is worse than all the others. But we can say that a failure state s dominates (is worse than) another state s' if the risk attributes of s are $\geqq$ the corresponding attributes of s', with strict inequality for at least one attribute. Given a set of network states, we can eliminate from consideration all states whose risk is dominated by that of some other state. What remains is known as the Pareto boundary or Pareto frontier of the risk set. The frontier can be extracted from the set by what is known as a "Pareto filter".

The filtering problem is: if V is a set of d-dimensional vectors in $R^d$, we want to eliminate from V all points v that are dominated by another point u∈V:u dominates v, denoted u≻v, if and only if $u_i \geqq v_i$ for all i with strict inequality for at least one i. Suppose that determining whether x≻y takes d units of time. Then given n points, a straightforward algorithm for eliminating all dominated points takes time $O(dn^2)$. A much better algorithm for d=2, requiring only O(n log n) time, is given as follows. Denote a point by $(x_i, y_i)$ and sort the points in order of increasing x, with increasing y for equal values of $x_i$. Without loss of generality, let the result be $(x_1, y_1)$, $(x_2, y_2), \ldots, (x_n, y_n)$. Then it is clear that any point can be dominated only by a point to its right. Starting from the end, $(x_{n-1}, y_{n-1})$ is dominated by a point on its right if and only if $y_{n-1} < y_n$. $(x_{n-2}, y_{n-2})$ is dominated by a point on its right if and only if $y_{n-2} < \max(y_{n-1}, y_n)$, etc. Finally, $(x_1, y_1)$ is dominated by some point to its right if and only if $y_1 < \max(y_2, \ldots, y_n)$. Denoting the maxima by $m_i$, the algorithm finds them in linear time by making a backward pass through the list to determine $m_{n-1}=y_n$, $m_{n-2}=\max(y_n, y_{n-1})$, $m_{n-3}=\max(y_n, y_{n-1}, y_{n-2}), \ldots, m_1=\max(y_n, \ldots, y_2)$. (The filtering problem may also be solved in O(n log n) time with a more general bi-criterion shortest path algorithm, but the procedure we described here is much simpler.)

5. Network Restoration in Performance Measures

We have implemented many of the concepts described in previous sections in software to evaluate commercial networks. This section describes the routing methods we implemented to model the IP layer for commercial IP-over-optical layered networks. However, we have also applied these methods to other layered networks. In each network state we have a new graph (a set of nodes fail, a set of edges fail or their capacities are reduced, etc.), and a set of demands affected by a failure that needs to be rerouted. The performance measures of §4 depend partly on how we select new routes for the failed demands. We use two schemes for selecting paths during network restoration:

1. Shortest-path routing, which models OSPF (Open Shortest Path First) routing where packets are sent over the shortest (minimum cost) paths. The path computation does not depend on the capacities or utilizations of the links. Note that the other main IP-layer routing protocol, IS-IS, would behave similarly in our context.

2. Optimal routing, which selects a set of minimum-cost paths that maximizes the amount of restored traffic while respecting the link capacities. This models a scheme where a centralized server has complete knowledge of the entire network and computes optimal routing paths. OSPF-TE (MPLS) may be considered to be an approximation to this.

The shortest-path routing, because it does not take link capacities into account, is likely to result in more congested links and thus larger values of $t_{lcg}$. On the other hand, it will have a lower value of $t_{lrt}$ because it checks only for connectivity, as opposed to a path with sufficient capacity.

Clearly, the above are idealized representations of real network routing and restoration protocols, in which many details are not taken into account. Notably, we do not model in detail the full set of complicated message exchanges (known as "signaling") that take place among network nodes to implement the routing algorithm.

5.1 Min-Cost Routing

We first construct a graph G=(V, E) where V is the set of network nodes and E represents the OSPF links. The link costs are equal to the OSPF administrative weights. The capacity of a link (multiedge) is equal to the sum of the edge capacities between this pair of nodes (recall §3.1). Capacities are not used for the minimum-cost (min-cost or shortest-path) computation, but are used for determining the set of congested links for calculation of $t_{lcg}$.

If there is more than one min-cost path between a pair of nodes, we balance the traffic as follows: for each source and destination pair (s, d) we compute NextHops(s, d), the set of neighbors of s that are on at least one min-cost path from s to d. Then we distribute all packets from s to d equally among all nodes in NextHops(s, d), and repeat recursively. To compute the all-pairs min-cost matrix we use the Floyd-Warshall algorithm). For a graph with n nodes and m edges, the complexity of this algorithm is $O(n^3)$.

5.2 Near-Optimal Routing

The network is specified as a directed graph with edges that have capacities and costs and a set of indivisible demands. The idealized problem that we want to solve is optimal restoration, i.e. "route as much total demand as possible subject to the capacity constraints, and so that the total cost is minimized".

This problem involves optimizing both the quantity of traffic routed and the cost (good-ness) of the routing. In network flow terminology, we have an integer min-cost max-multicommodity flow problem, i.e. among the maximal flows find one with least cost (the cost of a flow, equal to $\Sigma_i$ {flow over edge i×cost of edge i}).

Even very simple versions of this problem are hard. For example, deciding whether just two demands can be routed in a graph with edges all of the same capacity and no costs is NP-complete. But if the integrality (indivisibility) requirement on the edge capacities and flows is removed, min-cost multicommodity flow is solvable in polynomial time via linear programming.

We find an approximate solution to the optimal restoration problem by using a greedy heuristic which reduces the problem to a set of 1-commodity flow problems, and at the same time takes care of the integrality requirement. This is depicted in FIG. 20, where we employ R random orderings of N demands. Note that if an ordering is such that all of the single-commodity flow problems are feasible, it does not necessarily yield a solution of least cost. Given that optimal restoration can be solved only approximately, the greedy heuristic suggests the possibility of separating the quantity and cost aspects of the performance measure, and stopping the algorithm if a solution that routes all of the offered demand is found, no matter what its cost. Our implementation includes this option; it may be argued that such a solution corresponds better to what a realistic, non-centralized network routing protocol could achieve.

Finally, the heuristic lends itself well to speedup by parallelization. Given a set of M processors, R/M permutations are given to each, and, when finished, each processor reports its best result to the coordinating processor. Our implementation includes the option of parallel evaluation, using the Parallel Virtual Machine [PVM] infrastructure.

5.3 Speeding Up the Routing Computation to Enable Large State Space Analysis

It is not unusual for a network performability analysis to generate hundreds of thousands of states, and paths for the network demands need to be computed in every one of these states. We describe some improvements in the overall efficiency of the path computation that exploit the fact that when states are generated in order of probability, the state sequence exhibits a certain locality: typically, successive network states differ in only one component. In the case of min-cost routing, this implies that the all-pairs min-cost (classical shortest-distance) matrix typically changes little between adjacent states. One way to take advantage of this is via a dynamic graph algorithm. There are several such algorithms with strong worst-case asymptotic guarantees, but they are not easy to implement. In contrast, the improvements we describe below are very easy to implement and result in near-optimal running time for our specific application.

Figures 21, 22:
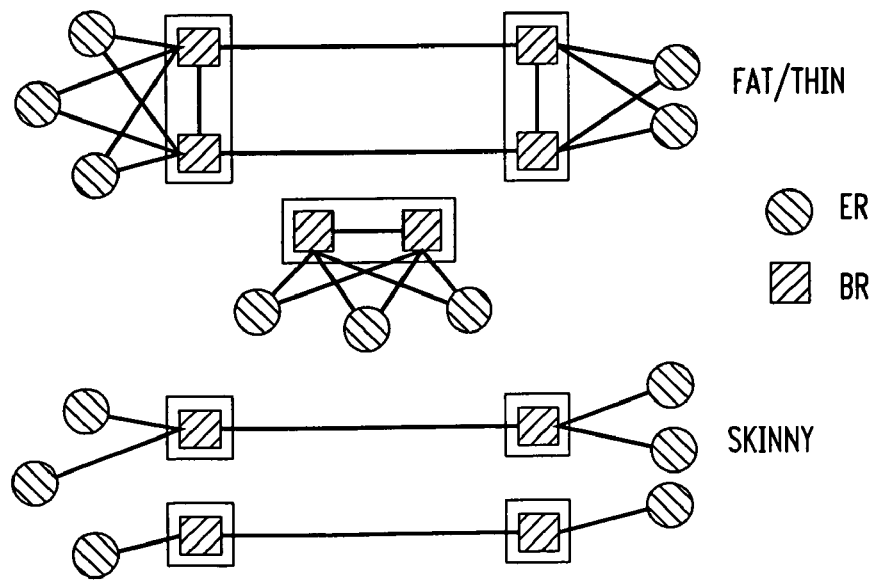

Improvement 1: affected node pairs Let $D_0$ be the all-pairs min-cost matrix for the network in the perfect (no failure) state. We want to reuse $D_0$ as much as possible in any state by computing the set of node pairs for which the min-cost has changed. Because there is no easy way of computing this set we use a filter to compute a superset. For any node pair, if the minimum-cost path between these nodes contains at least one failed edge, we put the node pair in the set AffectedNodePairs. If a node pair is not in this set, its min-cost path does not change (all of the edges in the shortest paths are there, and no new edges have been created). Then we run a modified Floyd-Warshall algorithm where the two innermost loops range over the nodes in AffectedNodePairs. FIG. 21 gives the pseudo-code. Note that the all-pairs min-cost path matrix is defined to be M (i,j)=the cost of the min-cost path from node i to node j. To establish the correctness of this algorithm, it remains to show that the min-cost for node pairs in AffectedNodePairs, which has either stayed the same or increased, is correctly computed. The only difficult part of this proof is to argue that the initialization in line 1 of D to $D_0$ (instead of initialization to edge costs) does not affect the correctness of the Floyd-Warshall algorithm. We establish this by a general proposition:

Proposition. For any graph G(V, E), construct a graph G' (V, E') as follows. Initialize E' to E. Then pick an arbitrary pair of nodes u, v and add an edge (u, v) to E' with cost equal to the min-cost path between u and v in G. Repeat this step for an arbitrary number of node pairs. Then the min-cost matrices for G and G' are identical.

This can be proved by induction on the number of extra edges added to E'. For each extra edge, a path of the same cost existed in the graph and thus none of the costs change because of the addition of this edge. Because the effect of initialization is the same as adding an extra edge of cost equal to the minimum cost path, this also completes our proof of the dynamic all-pairs min-cost algorithm.

Given the matrix $D_0$, the set of AffectedNodePairs can be computed in $O(n^2 \cdot (\text{number of failed edges}))$ time by cycling over each pair of failed edge (u, v) and node pair (s, d) and checking if $D_0[s, u]+\text{EdgeCost}[u, v]+D_0[v, d]=D_0[s, d]$. It takes an additional $O(n^2 \cdot |\text{AffectedNodePair(s)}|)$ steps to run the modified Floyd-Warshall algorithm. Thus the overall complexity is O $n^2 \cdot$(no. of failed edges+|AffectedNodePairs|)

Improvement 2: matrix caching Both the number of failed edges and the size of AffectedNodePairs depend on the size of the failure. Our next trick is to "reduce" the case of multiple component failures to the case of single component failures. This reduction is possible quite often because of the locality in the sequence of states produced by the algorithms of §2.2. When the reduction is possible, its effect is that "number of failed edges+size of AffectedNodePairs" corresponds to a single component failure, significantly improving the speed of the algorithm in FIG. 21.

Based on these observations, we modify the algorithm to maintain a cache of (set, matrix) pairs. In a state corresponding to a set of failed components C, we first check if the cache contains an entry $(C_1, D_1)$ such that $C_1$ is missing exactly one element of C. If such an entry is found, the algorithm of FIG. 21 is run with $D_0=D_1$ and as if a single component $c=C \setminus C_1$ has failed. If there is no match for C in the cache, we construct $C_1$ by copying C and removing the component which is least likely to fail from it. Then we compute the distance matrix $D'_1$ corresponding to $C_1$ and add $(C_1, D'_1)$ to the cache.

In our simulations of this scheme with a cache size of 25 and least-recently used re-placement policy, we found a cache hit rate of nearly 99%. Moreover, as we searched the cache from top to bottom, about 80% of the time we had a match among the first 2 entries, and about 90% of the time a match among the first 5 entries. Thus the average complexity (per state) of the all-pairs min-cost paths algorithm becomes a small constant times $n^2$.

6. Applications and Experimental Results

Here we report the results of running our tool on three network designs, variations on the IP-over-optical backbone network of a large Internet Service Provider.

Each design consists of a number of backbone locations. Each location houses one or two backbone routers (BRs), and has a set of associated edge routers (ERs). The ERs are connected to the BRs within the location. Each BR is connected to the other BR in the location, and to a set of BRs in other locations; see FIG. 6A. The ERs are divided into two groups: local and remote. We assume that the physical layer routings (spans) of the links connecting BRs and local ERs and BRs do not fail, although these pairs of nodes can still get disconnected if the corresponding router ports fail. The remaining links fail if at least one of their underlying spans fails (recall the model of §3.1). For our experiments we use component failure probabilities derived from a combination of field and vendor data. The location-to-location traffic matrix is given (produced from a "gravity model" algorithm based on IP link loads). We study three variations of a network design, whose basic structure is depicted in FIG. 22:

The "fat" design. Each location has two BRs, and each ER is connected to both the BRs in its associated location. The network has enough capacity to protect against any single span, port, or BR failure.

The "thin" design. This is similar to the fat design except that we do not allocate restoration capacity for BR failures.

The "skinny" design. Here we have only one BR per location, and each ER is connected to the single BR in the location. The network has enough capacity to protect against any single span and port (but no BR) failure.

All of these networks use OSPF-style restoration, and the designs use the "80/95" rule, namely that link packet utilization should be below 80% under no-failure conditions, and not exceed 95% after a failure. Specifically, the edge capacities are assigned so that each network meets the 80/95 rule for a certain set of single failures. This approach is common among most large ISPs, although the utilization levels and network design specifics differ. After a failure that is not in the "covered" set, some links may be utilized over 95% and it is even possible that some flows may not be restored. Our goal is to quantitatively evaluate effect of using reduced network capacity and fewer routers on the performability of the network. We also evaluate the effects of some improvements to routers, namely "hitless" software/hardware upgrades and N:1 port protection. For each network design we compute the CCDF (complementary CDF) of two measures: traffic lost because of no route, and traffic lost because of congestion, the $t_{lrt}$ and $t_{lcg}$ of (4.1). We define the lost traffic $t_{lost}$ to be the sum of these two. To protect proprietary information, we have multiplied the actual probabilities (y-axes) in all our plots by a fixed constant.

6.1 Lost Traffic

Figure 23A:
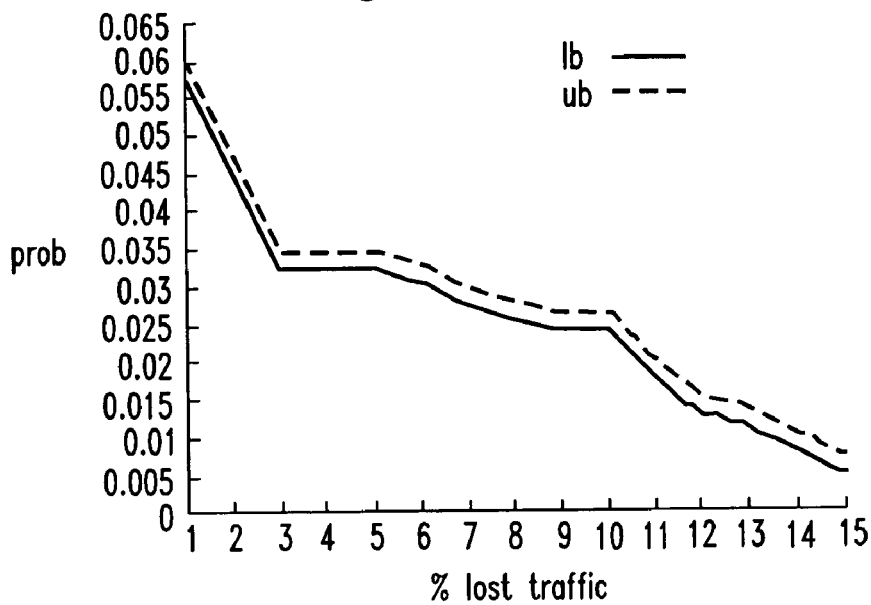
Figure 23B:
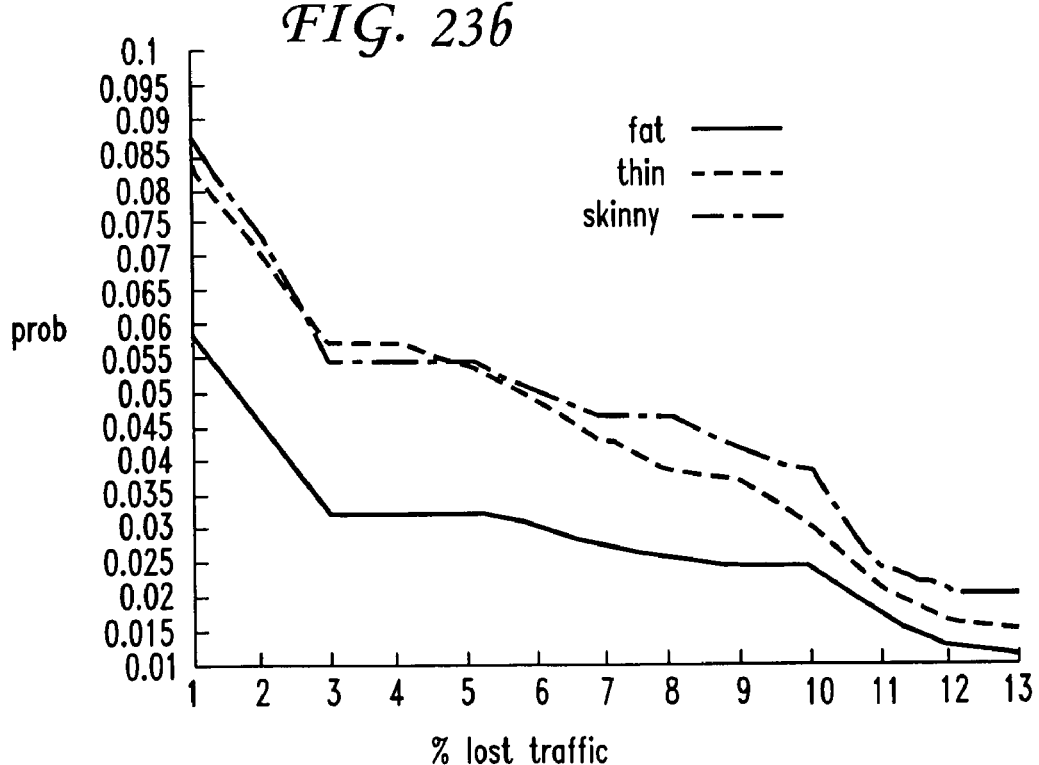

FIG. 23a shows the bounds on the lost traffic $t_{lost}$ for the fat design obtained by (2.4) after generating about 400,000 network states. The lower bound assumes that none of the traffic is lost in the unexplored state space, and the upper bound assumes that all of the traffic is lost in the unexplored state space. In our runs, the unexplored failure space consists of some double, triple, and quadruple failure states and all of the failures of larger sizes. If we weight these states according to their probabilities, most of the unexplored probability mass is concentrated on double and triple failure states. Based on empirical knowledge of network restoration performance in the double and triple failure states, the precise lost traffic metric is closer to the lower bound. Obviously, this conclusion changes if we explore more states, or investigate a different type of network. For simplicity, in all subsequent plots we show only the lower bound curve. FIG. 23b shows lost traffic for all three network designs. For all our reported results in this paper we will show only the $t_{lost}$ curves. Note that the $t_{lrt}$ component (lost traffic because of no path) depends only on the network topology, and therefore the fat and the thin designs have identical performance with respect to $t_{lrt}$. However, as FIG. 23b shows, the fat and the thin designs have very different characteristics when compared on the basis of total lost traffic, which includes $t_{lcg}$ the traffic lost because of congestion.

In all these CCDF graphs, the plots are smoothed versions of staircase-like functions. The abrupt changes in slope of the CCDF curves are due to the discrete nature of the probability space and the complex mapping from this space to the value of the measure. In particular, the relatively flat segments are not caused by any particular set of failures, but by the absence of failures that, via the discrete mappings from the physical to the traffic layer, cause traffic loss of a certain magnitude.

One may note in FIG. 23b that the skinny network gives a better guarantee than the thin network at low values of $t_{lost}$. The reason is that the skinny network has fewer components (e.g. router ports), and thus a higher probability of being in the no-failure state. As the fraction of lost traffic increases, the better restoration behavior of the thin network translates into better performance. On the other hand, the fat network is superior everywhere because its restoration behavior is so much better than that of the thin and skinny networks.

6.2 Router Enhancements

Here we look at two possible improvements to the reliability of routers and assess the effect of these improvements on the entire network from the viewpoint of lost traffic.

6.2.1 Hitless Upgrades

Figure 24:
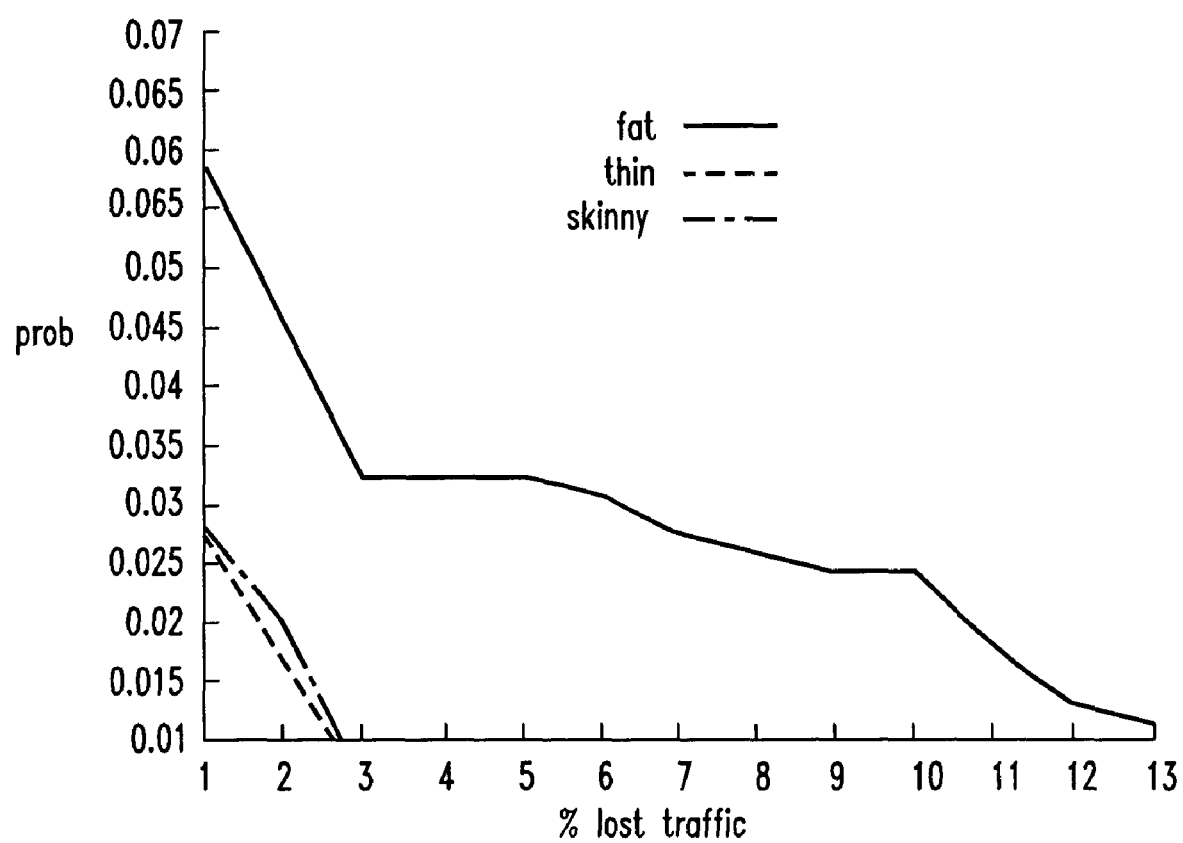

FIG. 23 assumes that whenever a router's software or hardware is upgraded, the router is taken out of service. We assume three 30-minute software upgrades and one 60-minute hardware upgrade per year for each router, and model the state space using multi-mode components such that at most one BR from a given backbone location gets upgraded at a time (recall §3.2). A new generation of commercial routers provides "hitless" software upgrades, and we want to assess the resulting performability improvement. FIG. 24 shows that the improvement is dramatic. In fact, the performance of the "thinned-down" designs becomes better than the performance of the fat design with normal upgrades! One caveat is that these results were obtained assuming a constant traffic matrix throughout a day, whereas in reality router upgrades are often scheduled during low-traffic periods. If such an upgrade policy were in effect, the difference in the performance of the three designs would be smaller than what FIG. 24 indicates.

6.2.2 Port Protection

Here we investigate the effect of adding N:1 protection on router ports. We define groups of N ports ahead of time, each with an (N+1)th protection port. When a port fails and the protection port in its group is working, then the link is switched to the protection port, which takes over the role of the failed port. If multiple ports within the same protection group fail, at most one of the failed ports can be restored; the rest remain failed.

Without port protection, the probability that a port does not fail is 1−q. With protection, a port stays up in any state in which it has not failed; the set of all these states has probability 1−q. The port also stays up in any state in which it has failed but every other port, including the protection port in its group, is up; this set of states has total probability $q(1-q)^N$. Hence $$Pr(\text{a protected port stays up}) = (1-q)+q(1-q)^N \geqq 1-Nq^2.$$

Figure 25A:
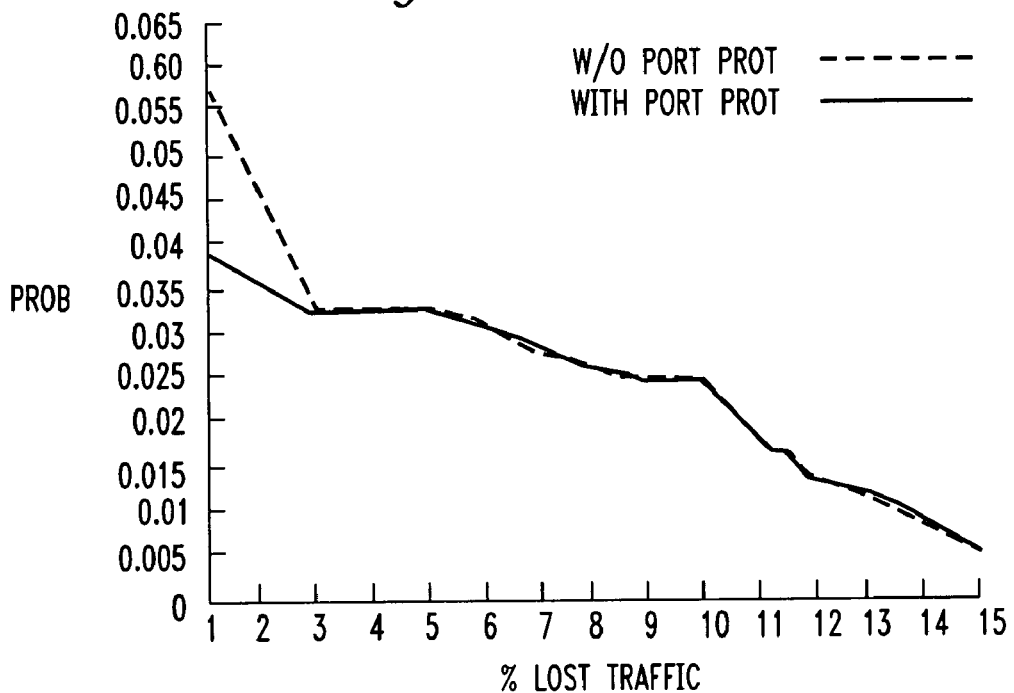

This shows that for typical (small) values of q, the effect of protection is, surprisingly, almost independent of the protection group size N. FIG. 25 shows the results for the fat design. It can be seen that without hitless router upgrades, port protection is not very effective. This is because a port can go down either because the port itself fails, or because the whole router is down. Port protection helps in the first case, but not in the second. In our model, the router being down is an order of magnitude more likely than one of its router port failures, so it makes little difference whether or not ports are protected.

Figure 25B:
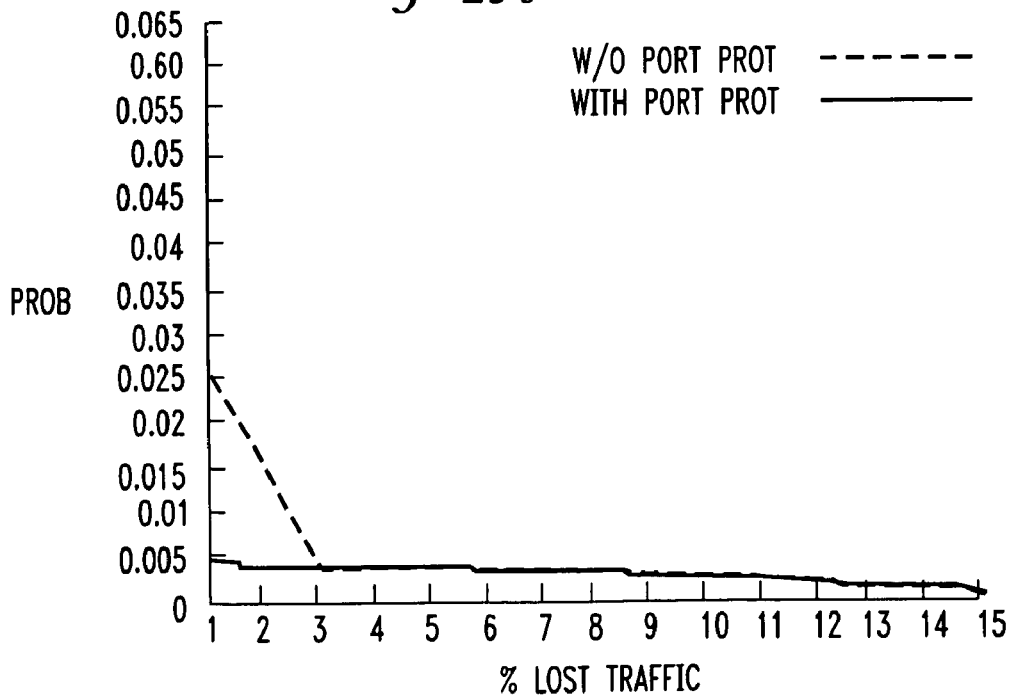

However, router upgrades are the major contributor to a router being down. If we make the upgrades hitless, the probability of a router being down no longer dominates the probability of a port failure and FIG. 25b shows that port protection does make a significant difference. In both cases, the benefits of port protection are concentrated near low percentages of lost traffic. The higher percentages of lost traffic result from failure states (typically involving complete router failures and fiber cuts) where port protection makes little difference.

The conclusion for the network in this case study is that software upgrades are a major contributor to network downtime. If the upgrades were made hitless, port protection would further improve the network's performability, and there is even a promise of being able to reduce restoration capacity and still maintain the same performability levels.

6.3 Risk Assessment

In §6.1 and §6.2 we evaluated three network designs by looking at performability guarantees, recall (2.2), for the lost traffic measure. Another, complementary, assessment consists in examining the space of explored failures from the viewpoint of risk and the Pareto frontier.

Figure 26A:
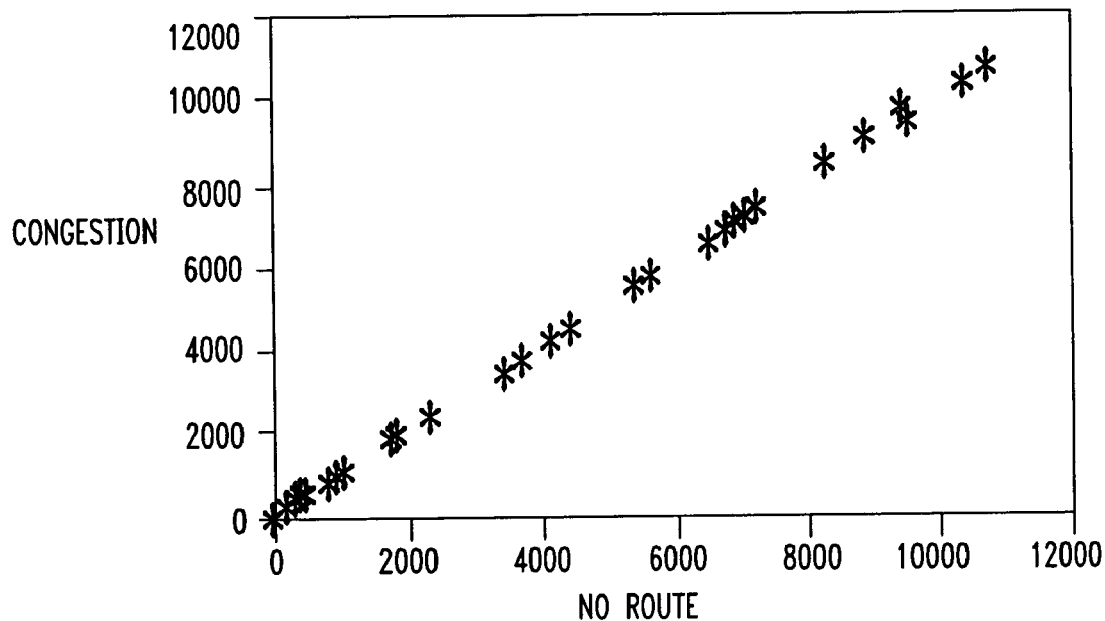
Figure 26B:
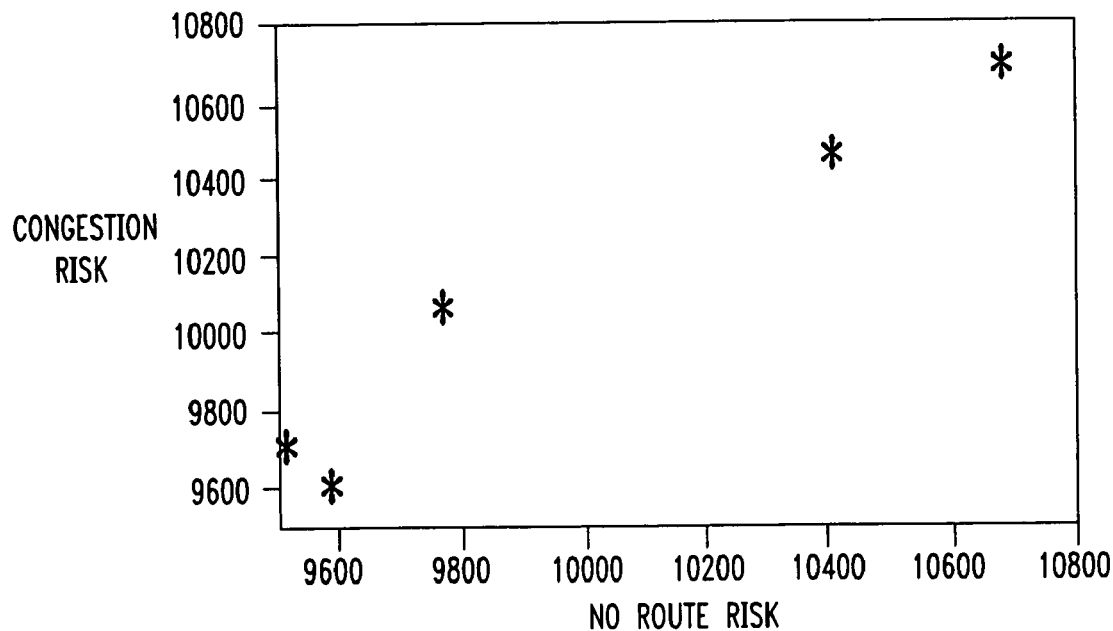

As explained in §4.4, risk is defined with respect to a particular traffic measure: at each network state, the value of the measure is multiplied by the probability of the state. With the 4-dimensional traffic measure of (4.1), the risk associated with a failure has 4 attributes. FIG. 26a shows a scatter plot of two of these attributes for the fat network design, $t_{lcg}$ and $t_{lrt}$ risk. There are about 400,000 points in the plot, and each point (x, y) denotes a failure with no-route risk x and congestion risk y. Evidently the risks vary by many orders of magnitude, but the upper right "corner" of the scatter plot, in this case above the point (10000,10000), contains the worst failures with respect to both risk attributes. These are the failures that one would want to address first when contemplating improvements to the network; they lie on Pareto frontier of the failure set. FIG. 26b shows the result of running the Pareto filter on the failures of FIG. 26a three times in succession, each time eliminating the extracted frontier from the set. The first and second frontiers consist of a single point each, corresponding to the failure of a major virtual edge router (recall §3.1) of the ISP, while the third frontier consists of the failures of another two major virtual edge routers.

Conclusion

The foregoing is merely illustrative. For example, although the invention has been illustrated in the context of packet networks, the principles of the invention are equally applicable to other kinds of networks. For example, the invention could be used to determine a performability characteristic for circuit-switched networks. In such an application of the invention, a typical performance measure would be "Is there a path available between source A and destination B?" Another might be, "Is there a path available between source A and every possible destination B, C, D, etc" Another might be "Is there a path available between each possible source/destination pair." In each of these cases, the performance measure would have the value of "1" or "0" for each different network state depending on whether or not the path(s) in question are available in that network state. The performability characteristic, then, would be an indication of the extent to which it is likely, across all network states considered, that the path(s) in question would, in fact, be available.

An aspect of our invention encompasses a computer-readable medium on which are stored instructions that are executable by a processor to carry out the methods disclosed herein.

It will thus be appreciated that those skilled in the art will be able to design other arrangements and methods which, although not explicitly shown herein, embody our inventive principles and are thus within their spirit and scope.

The invention claimed is:

1. A method for computing a performability characteristic for a communications network that comprises a plurality of network components including a plurality of interconnected links, the method comprising computing by a computer processor a performance measure associated with each of a plurality of states of the network, each of at least ones of the states of the network including at least one failed network component, the performance measure being computed based on attributes of edges of a logic level graph of the network, each of the edges of the logic level graph representing a route through the network over one or more corresponding ones of the links, the attributes of the edges being determined at least by attributes of the one or more corresponding links in said each of the network states, and computing by the computer processor the performability characteristic based on the performance measures computed for the plurality of network states, at least one other of the states of the network being a state in which the network, or one or more of the network's components, is in an operational mode that is other than a partial or total failure mode but that affects at least one attribute of at least one of the edges of the logic level graph of the network.

2. The method of claim 1 wherein the performability characteristic is a function of the product of a) each of the performance measures with b) a probability that the network is in the associated network state.

3. The method of claim 2 wherein said probability is a function of a fraction of time that said network, or said one or more of the network's components, is expected to be in said operational mode.

4. The method of claim 2 wherein said operational mode is scheduled maintenance of a one or more network elements.

5. The method of claim 3 wherein said operational mode is scheduled maintenance of a one or more network elements.

6. A computer-readable medium on which are stored instructions that are executable by a processor to carry out a method for computing a performability characteristic for a communications network that comprises a plurality of network components including a plurality of interconnected links, the method comprising computing by a computer processor a performance measure associated with each of a plurality of states of the network, each of at least ones of the states of the network including at least one failed network component, the performance measure being computed based on attributes of edges of a logic level graph of the network, each of the edges of the logic level graph representing a route through the network over one or more corresponding ones of the links, the attributes of the edges being determined at least by attributes of the one or more corresponding, links in said each of the network states, and computing by the computer processor the performability characteristic based on the performance measures computed for the plurality of network states,
at least one other of the states of the network being a state in which the network, or one or more of the network's components, is in an operational mode that is other than a partial or total failure mode but that affects at least one attribute of at least one of the edges of the logic level graph of the network.

\* \* \* \* \*